United States Patent
Dai et al.

(10) Patent No.: US 9,791,668 B2
(45) Date of Patent: Oct. 17, 2017

(54) LENS SYSTEM WITH SIX LENSES

(71) Applicant: Zhejiang Sunny Optics Co., Ltd., Yuyao (CN)

(72) Inventors: Fujian Dai, Yuyao (CN); Lin Huang, Yuyao (CN)

(73) Assignee: Zhejiang Sunny Optics Co., Ltd. (CN)

( * ) Notice: Subject to any disclaimer, the term of this patent is extended or adjusted under 35 U.S.C. 154(b) by 12 days.

(21) Appl. No.: 14/649,398

(22) PCT Filed: Aug. 22, 2014

(86) PCT No.: PCT/CN2014/085058
§ 371 (c)(1),
(2) Date: Jun. 3, 2015

(87) PCT Pub. No.: WO2015/062351
PCT Pub. Date: May 7, 2015

(65) Prior Publication Data
US 2015/0316750 A1 Nov. 5, 2015

(30) Foreign Application Priority Data
Oct. 30, 2013 (CN) .......................... 2013 1 0528758

(51) Int. Cl.
*G02B 3/02* (2006.01)
*G02B 13/18* (2006.01)
(Continued)

(52) U.S. Cl.
CPC ........... *G02B 13/0045* (2013.01); *G02B 9/60* (2013.01)

(58) Field of Classification Search
CPC .............. G02B 13/0045; G02B 13/001; G02B 13/0015; G02B 9/62; G02B 15/177
(Continued)

(56) References Cited

U.S. PATENT DOCUMENTS

| 8,369,027 B2 | 2/2013 | Hsu et al. |
| 2011/0043664 A1* | 2/2011 | Mihara ............... G02B 15/177 348/240.3 |

(Continued)

FOREIGN PATENT DOCUMENTS

| CN | 202256844 U | 5/2012 |
| CN | 102621667 A | 8/2012 |

(Continued)

OTHER PUBLICATIONS

International Search Report for Application No. PCT/CN2014/085058 dated Nov. 26, 2014.

*Primary Examiner* — Mahidere Sahle
(74) *Attorney, Agent, or Firm* — Lerner, David, Littenberg, Krumholz & Mentlik, LLP

(57) ABSTRACT

The present disclosure relates to a lens system comprising a first lens group and a second lens group from an object side to an image side successively; wherein, the first lens group comprises a first lens, a second lens and a third lens from the object side to the image side successively; the second lens group comprises a fourth lens, a fifth lens and a sixth lens from the object side to the image side successively; the first lens has a positive focal power and the second, the fifth, and the sixth lens have a negative focal power, and the object side surface of the first and the second lens are convex, the image side surface of the fifth lens is convex, the object side surface of the fifth and the sixth lens are concave, and the image side surface of the second and the sixth lens are concave.

12 Claims, 14 Drawing Sheets

(51) Int. Cl.
*G02B 13/00* (2006.01)
*G02B 9/60* (2006.01)

(58) Field of Classification Search
USPC .................................................. 359/642–830
See application file for complete search history.

(56) References Cited

U.S. PATENT DOCUMENTS

| | | | |
|---|---|---|---|
| 2013/0215520 A1 | 8/2013 | Lai et al. | |
| 2014/0185150 A1 | 7/2014 | Shinohara et al. | |
| 2014/0327808 A1* | 11/2014 | Chen ........................ | G02B 9/62 348/335 |
| 2014/0347745 A1 | 11/2014 | Shinohara | |

FOREIGN PATENT DOCUMENTS

| | | |
|---|---|---|
| CN | 103217783 A | 7/2013 |
| CN | 103543520 A | 1/2014 |
| CN | 103576296 A | 2/2014 |
| CN | 203606557 U | 5/2014 |
| JP | 2013190515 A | 9/2013 |
| JP | 2014013293 A | 1/2014 |
| JP | 2014035397 A | 2/2014 |
| JP | 2015079164 A | 4/2015 |
| TW | 201337319 A | 9/2013 |
| WO | 2013150755 A1 | 10/2013 |

\* cited by examiner

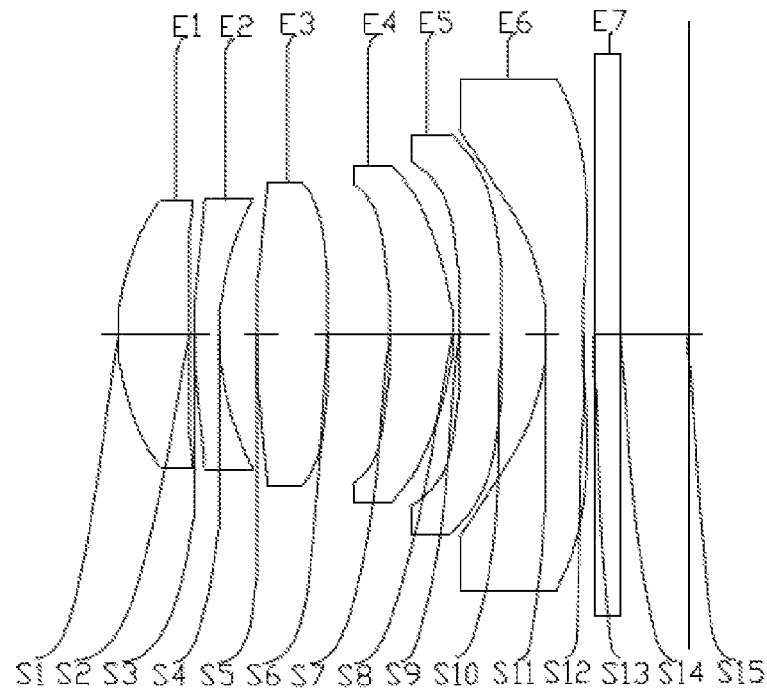
Fig. 1
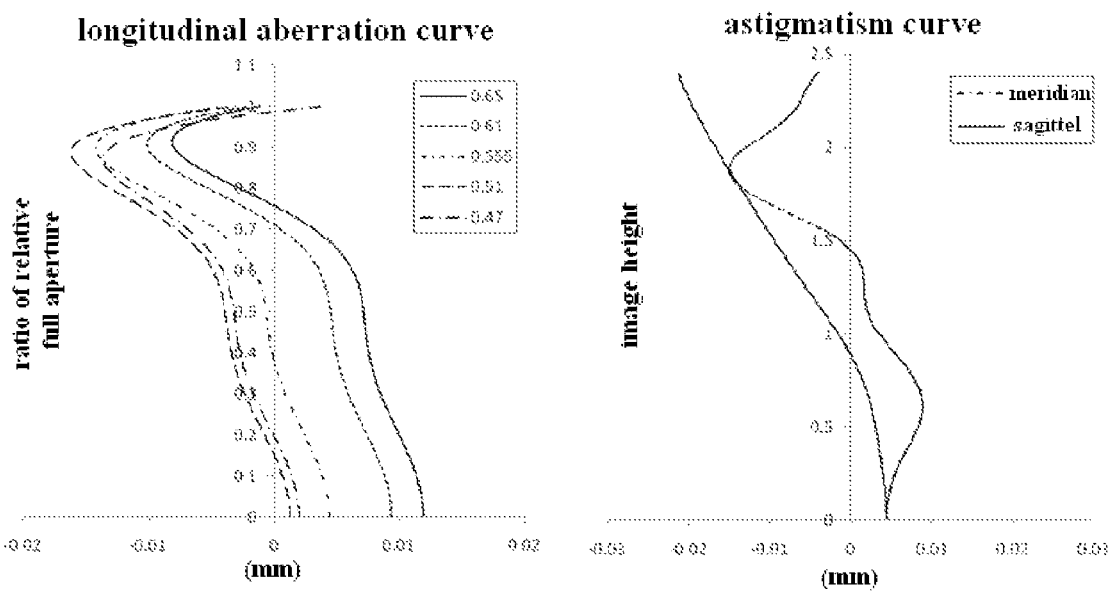
Fig. 2
Fig. 3

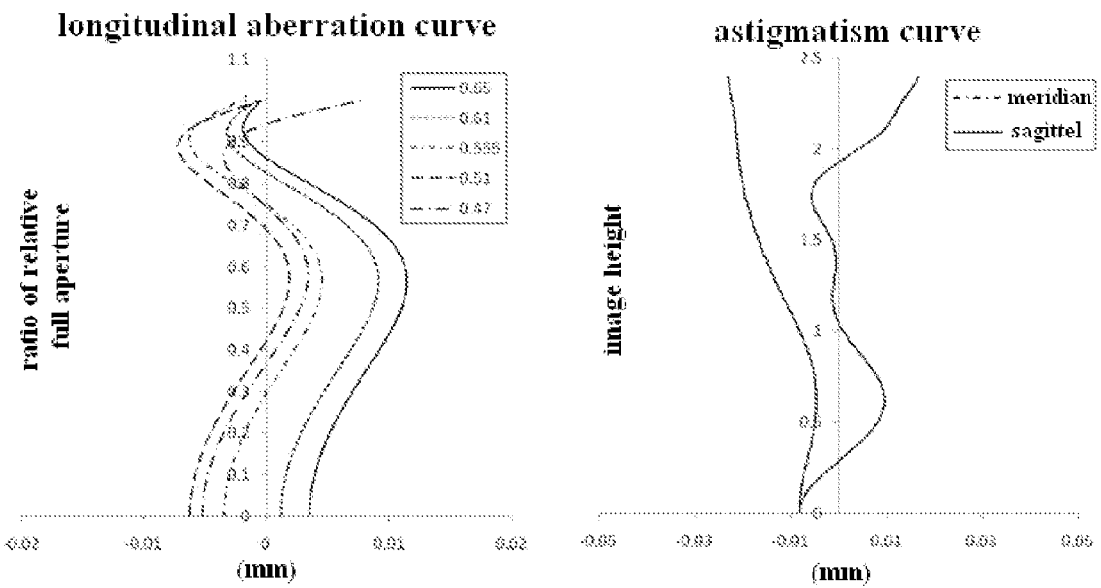
Fig. 7
Fig. 8
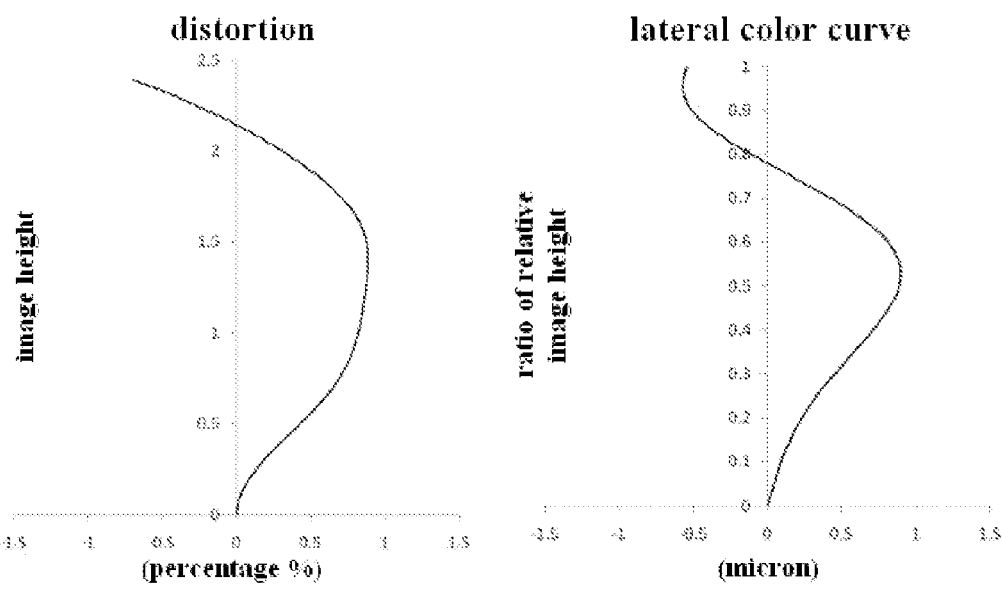
Fig. 9
Fig. 10

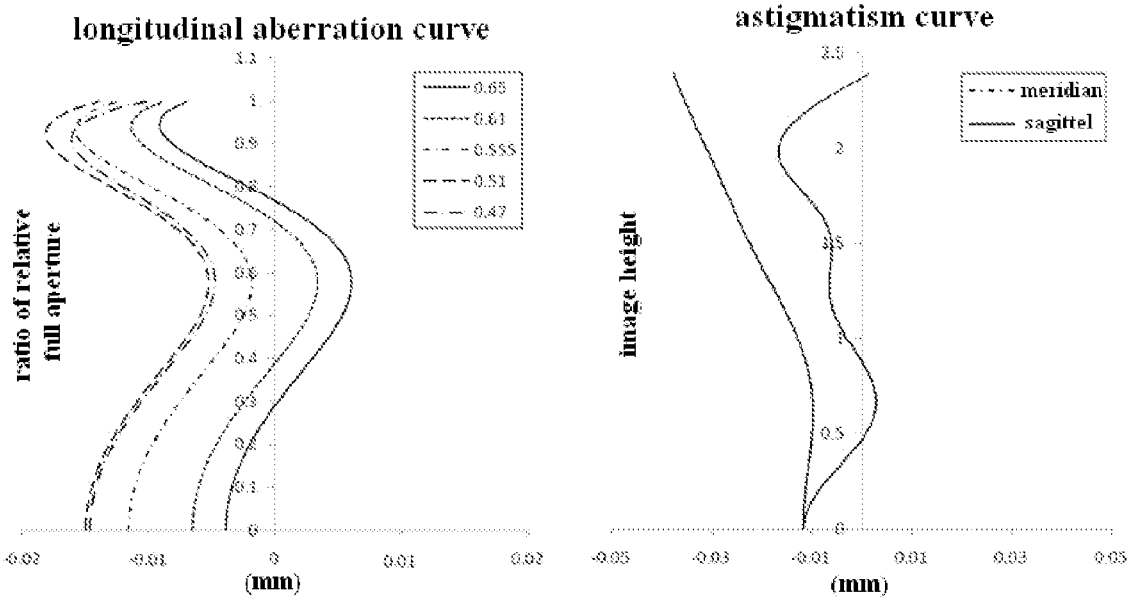
Fig. 17
Fig. 18
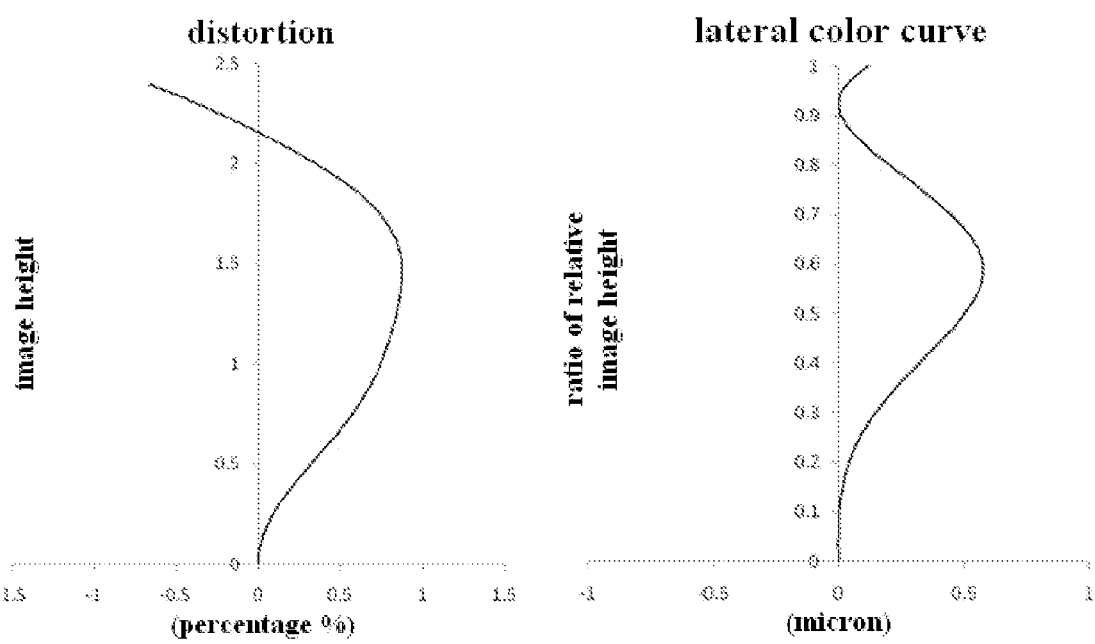
Fig. 19
Fig. 20

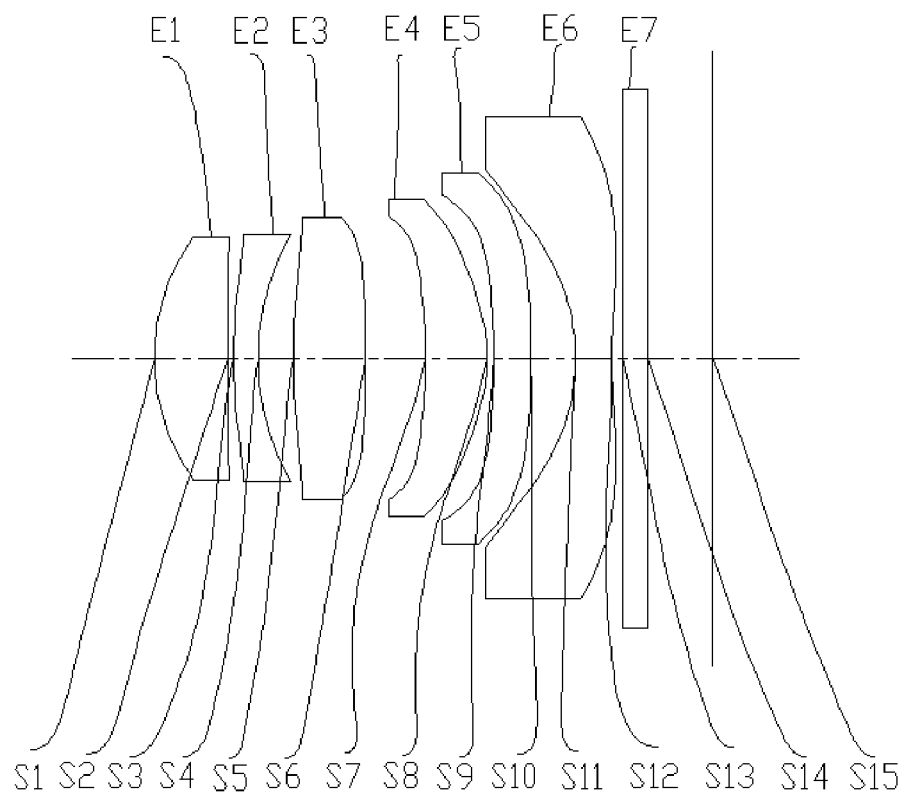
Fig. 21
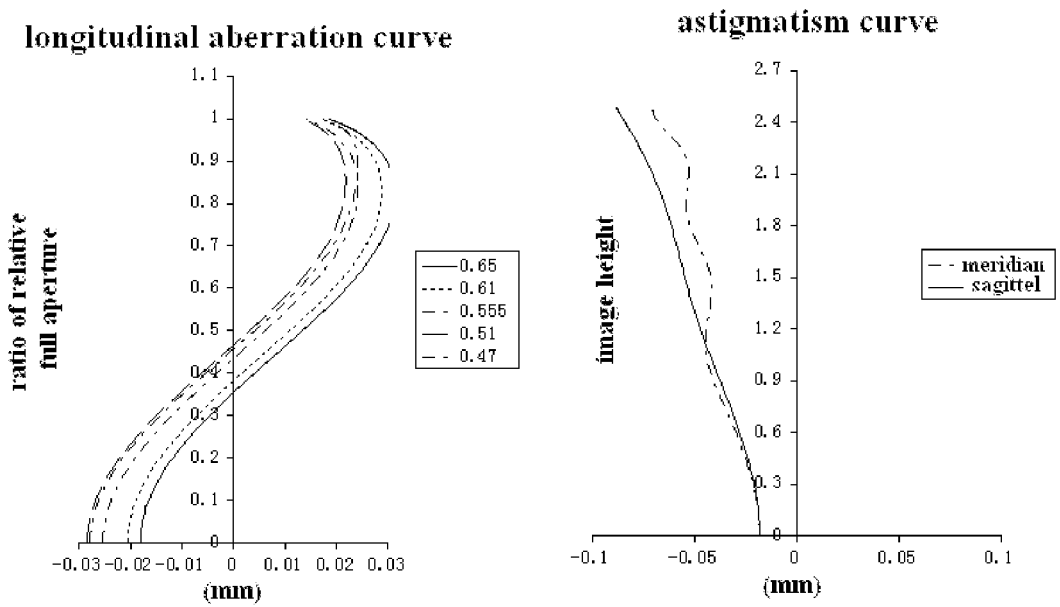
Fig. 22
Fig. 23

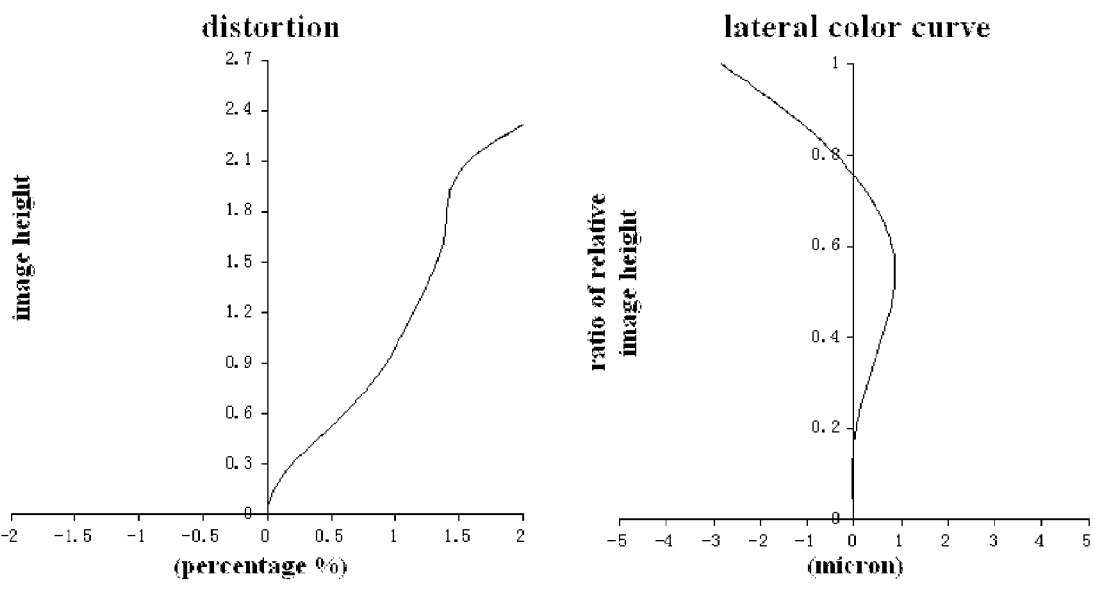
Fig. 24
Fig. 25
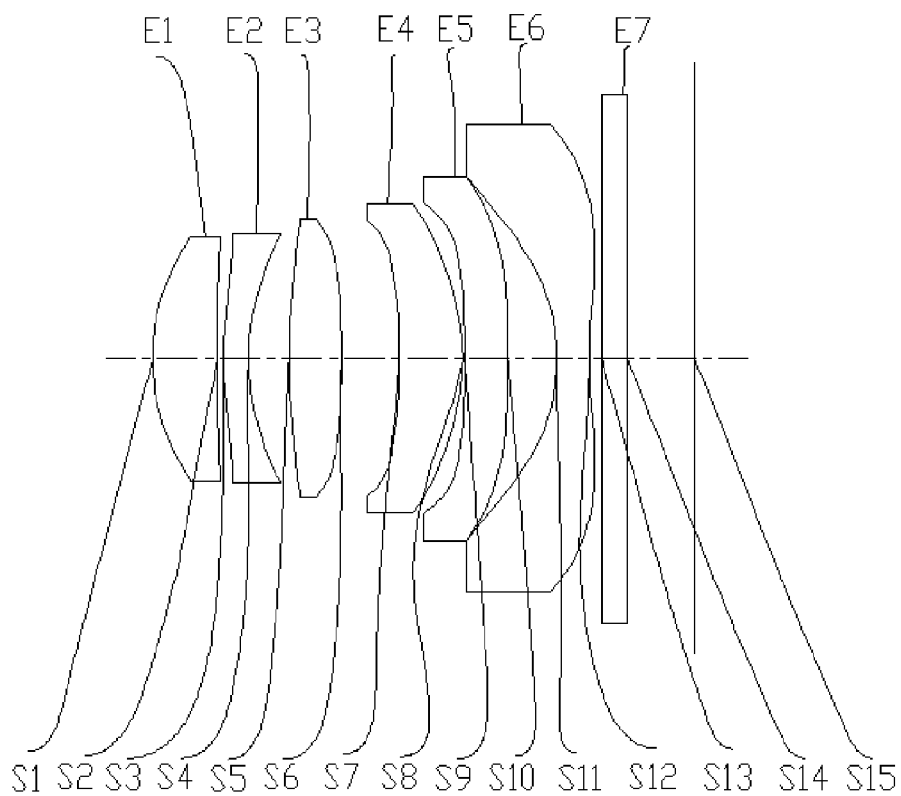
Fig. 26

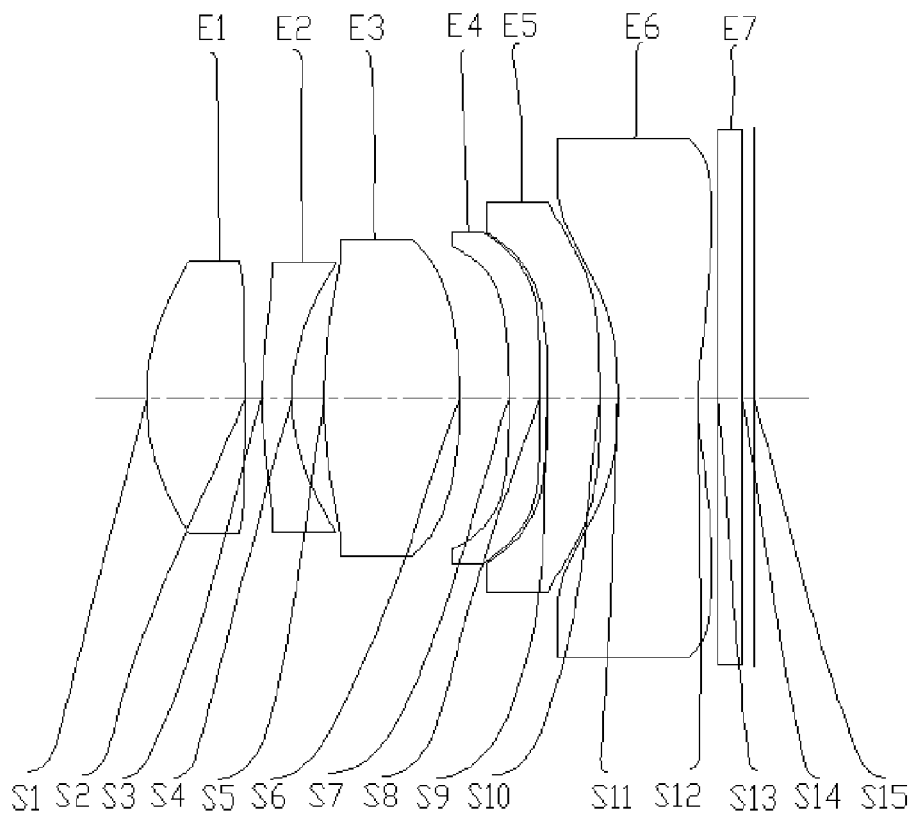
Fig. 41
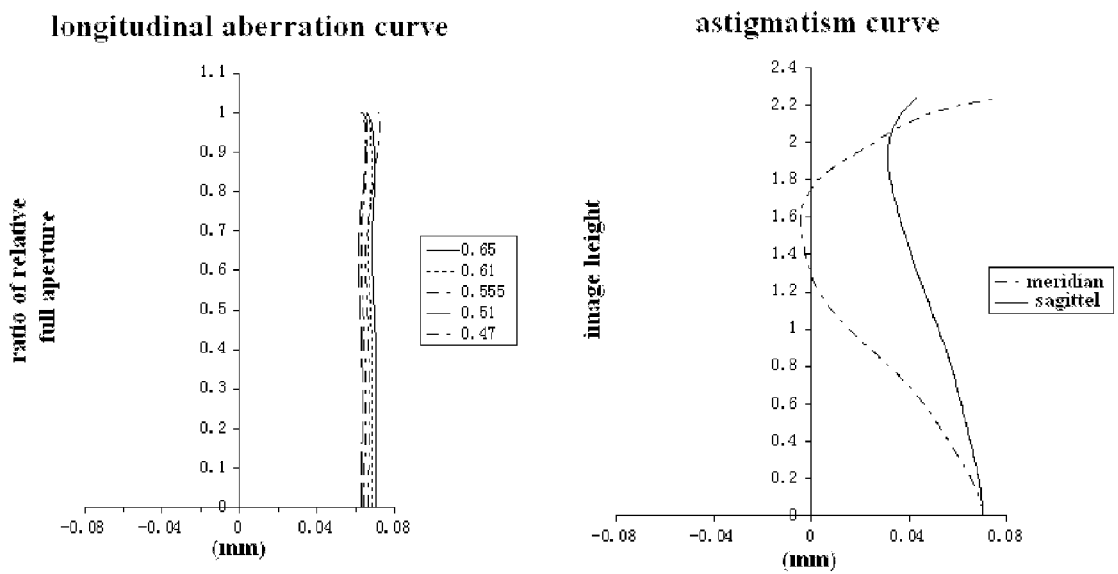
Fig. 42
Fig. 43

LENS SYSTEM WITH SIX LENSES

CROSS-REFERENCE TO RELATED APPLICATION

The present application is a national phase entry under 35 U.S.C §371 of International Application No. PCT/CN2014/085058, filed Aug. 22, 2014, which claims priority to Chinese Patent Application No. 201310528758.8, filed with the State Intellectual Property Office of P. R. China on Oct. 30, 2013, the entire contents of all of which are incorporated herein by reference.

FIELD

The present disclosure relates to an imaging technology, and more particularly to a lens system with six lenses.

BACKGROUND

In recent years, with the development of a chip technology of CCD or CMOS and the like, a pixel size of the chip becomes smaller and smaller, and a requirement for an imaging quality of a matching optical system also becomes higher and higher, while a size of an optical lens mounted on electronic products such as a mobile phone or a digital camera becomes smaller and smaller, so that the lens develops rapidly towards a miniature and high pixel trend. At present, a common high pixel thin type lens mainly makes use of a five lens, as described in U.S. Pat. No. 8,369,027. However, a requirement for a pixel and an imaging quality of a miniaturized camera lens is further promoted because of developments of portable electronic products. The known optical system can't satisfy higher photography demand. Currently, more lenses are used to further promote the imaging quality, but the size of the lens is hard to control, and therefore commercialization is limited. A lens with good imaging quality and with a length not much influenced by number of lenses is needed.

SUMMARY

Embodiments of the present disclosure seek to solve at least one of the problems existing in the related art to at least some extent. Therefore a lens system is provided in the embodiments of the present disclosure.

According to a first aspect of the present disclosure, a lens system is provided. The lens system comprises a first lens group and a second lens group from an object side to an image side successively, wherein the first lens group comprises a first lens, a second lens and a third lens from the object side to the image side successively; the second lens group comprises a fourth lens, a fifth lens and a sixth lens from the object side to the image side successively, the first lens has a positive focal power and the object side surface of the first lens is convex, the second lens has a negative focal power and the object side surface of the second lens is convex, the fifth lens has a negative focal power and the image side surface of the fifth lens is convex, the sixth lens has a negative focal power and the object side surface of the sixth lens is concave, the image side surface of the second lens is concave, the object side surface of the fifth lens is concave, the image side surface of the sixth lens is concave, and the lens system satisfies conditional expressions as follows:

$-6.8 < f4.5.6/Dr7r12 < -3.0$; and $-3.2 < f4.5.6/f < -1.65$, in which, f4.5.6 represents an effective focal length of the second lens group, Dr7r12 represents an axis distance between the object side surface of the fourth lens and the image side surface of the sixth lens, and f represents the effective focal length of the lens system.

In some embodiments, the image side surface of the first lens is concave.

In some embodiments, the third lens and the fourth lens have a positive focal power, the object side surface and the image side surface of the third lens are convex, the object side surface of the fourth lens is concave, and the image side surface of the fourth lens is convex.

In some embodiments, the lens system further comprises an aperture stop set between the object and the second lens.

According to a second aspect of the present disclosure, there is provide a lens system comprising a first lens group and a second lens group from an object side to an image side successively, wherein the first lens group comprises a first lens, a second lens and a third lens from the object side to the image side successively, the second lens group comprises a fourth lens, a fifth lens and a sixth lens from the object side to the image side successively; the first lens has a positive focal power and the object side surface of the first lens is convex, the second lens has a negative focal power and the object side surface of the second lens is convex, the fifth lens has a negative focal power and the image side surface of the fifth lens is convex, the sixth lens has a negative focal power and the object side surface of the sixth lens is concave, the image side surface of the second lens is concave, the object side surface of the fifth lens is concave, the image side surface of the sixth lens is concave, and the lens system satisfies conditional expressions as follows:

$-6.8 < f4.5.6/Dr7r12 \leq 5$; and $-3.2 < f4.5.6/f \leq 3.1$, in which, f4.5.6 represents an effective focal length of the second lens group, Dr7r12 represents an axis distance between the object side surface of the fourth lens and the image side surface of the sixth lens, and f represents the effective focal length of the lens system.

In some embodiments, the lens system satisfies conditional expressions as follows:

$-18 < f5/f < -4.6$; and $-6 < (R9+R10)/(R9-R10) < 1$, in which, f5 represents the effective focal length of the fifth lens, R9 represents a curvature radius of the object side surface of the fifth lens and R10 represents the curvature radius of the image side surface of the fifth lens.

In some embodiments, the lens system satisfies conditional expressions as follows:

$0.5 < R12/f < 1.5$; and $|(R11+R12)/(R11-R12)| < 1$, in which, R11 represents a curvature radius of the object side surface of the sixth lens and R12 represents a curvature radius of the image side surface of the sixth lens.

In some embodiments, the lens system satisfies conditional expression as follows:

$1.7 < TTL/ImgH < 2.4$;

in which, TTL represents an overall length of the lens system, ImgH is a half of a diagonal length of an effective pixel area on an imaging plane.

According to a third aspect of the present disclosure, there is provide a lens system comprising a first lens group and a second lens group from an object side to an image side successively, wherein the first lens group comprises a first lens, a second lens and a third lens from the object side to the image side successively, the second lens group comprises a fourth lens, a fifth lens and a sixth lens from the object side to the image side successively, the first lens has a positive focal power and the object side surface of the first lens is convex, the second lens has a negative focal power and the object side surface of the second lens is convex, the fifth lens has a negative focal power and the image side surface of the fifth lens is convex, the sixth lens has a negative focal power and the object side surface of the sixth lens is concave, the image side surface of the second lens is concave, the object side surface of the fifth lens is concave, the image side surface of the sixth lens is concave.

In some embodiments, the lens system satisfies conditional expressions as follows:

$$-18<f5/f<-4.6; \text{ and}$$

$$-6<(R9+R10)/(R9-R10)<1,$$

in which, f5 represents an effective focal length of the fifth lens, R9 represents a curvature radius of the object side surface of the fifth lens and R10 represents the curvature radius of the image side surface of the fifth lens.

In some embodiments, the lens system satisfies conditional expressions as follows:

$$0.5<R12/f<1.5; \text{ and}$$

$$|(R11+R12)/(R11-R12)|<1,$$

in which, R11 represents a curvature radius of the object side surface of the sixth lens and R12 represents the curvature radius of the image side surface of the sixth lens.

In some embodiments, the lens system satisfies conditional expression as follows:

$$1.7<TTL/ImgH<2.4;$$

in which, TTL represents an overall length of the lens system, ImgH is a half of a diagonal length of an effective pixel area on an imaging plane.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic diagram of a lens system according to Embodiment 1 of the present disclosure;

FIG. 2 is a longitudinal aberration chart (mm) of a lens system according to Embodiment 1 of the present disclosure;

FIG. 3 is an astigmatism chart (mm) of a lens system according to Embodiment 1 of the present disclosure;

FIG. 7 is a longitudinal aberration chart (mm) of a lens system according to Embodiment 2 of the present disclosure;

FIG. 8 is an astigmatism chart (mm) of a lens system according to Embodiment 2 of the present disclosure;

FIG. 9 is a distortion chart (%) of a lens system according to Embodiment 2 of the present disclosure;

FIG. 10 is a lateral color chart (mm) of a lens system according to Embodiment 2 of the present disclosure;

FIG. 17 is a longitudinal aberration chart (mm) of a lens system according to Embodiment 4 of the present disclosure;

FIG. 18 is an astigmatism chart (mm) of a lens system according to Embodiment 4 of the present disclosure;

FIG. 19 is a distortion chart (%) of a lens system according to Embodiment 4 of the present disclosure;

FIG. 20 is a lateral color chart (mm) of a lens system according to Embodiment 4 of the present disclosure;

FIG. 21 is a schematic diagram of a lens system according to Embodiment 5 of the present disclosure;

FIG. 22 is a longitudinal aberration chart (mm) of a lens system according to Embodiment 5 of the present disclosure;

FIG. 23 is an astigmatism chart (mm) of a lens system according to Embodiment 5 of the present disclosure;

FIG. 24 is a distortion chart (%) of a lens system according to Embodiment 5 of the present disclosure;

FIG. 25 is a lateral color chart (mm) of a lens system according to Embodiment 5 of the present disclosure;

FIG. 26 is a schematic diagram of a lens system according to Embodiment 6 of the present disclosure;

FIG. 41 is a schematic diagram of a lens system according to Embodiment 9 of the present disclosure;

FIG. 42 is a longitudinal aberration chart (mm) of a lens system according to Embodiment 9 of the present disclosure;

FIG. 43 is an astigmatism chart (mm) of a lens system according to Embodiment 9 of the present disclosure;

REFERENCE NUMERALS

Figure 4:
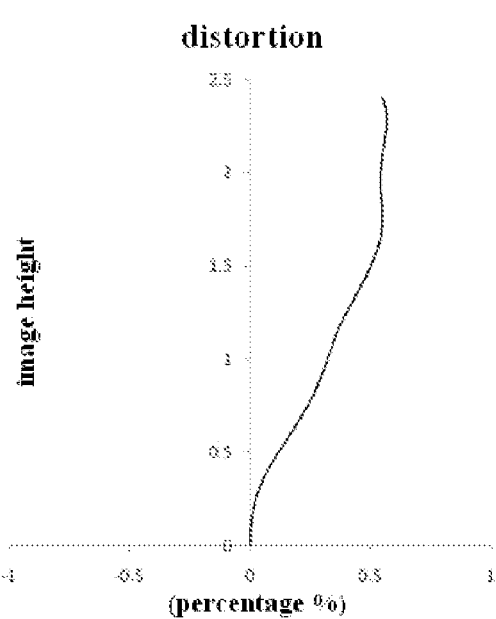
FIG. 4 is a distortion chart (%) of a lens system according to Embodiment 1 of the present disclosure.

E1: first lens; E2: second lens; E3: third lens; E4: fourth lens; E5: fifth lens; E6: sixth lens; S1-S15: surface.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

In the description of the present disclosure, it is to be understood that terms such as "central", "longitudinal", "lateral", "length", "width", "thickness", "up", "down", "front", "rear", "right", "left", "vertical", "horizontal", "top", "bottom", "inner", "outer", "clockwise", "anticlockwise" should be construed to refer to the orientation or position as shown in the drawings under discussion. These relative terms are for convenience of description and do not indicate or imply that the apparatus or members must have a particular orientation or be constructed and operated in a particular orientation. Therefore, these terms shall not be construed to limit the present disclosure. Thus terms such as "first" and "second" are used herein for purposes of description and are not intended to indicate or imply relative importance or to imply the number of indicated technical features. Thus, the feature defined with "first" and "second" may explicitly or implicitly include one or more of this feature. Furthermore, in the description of the present disclosure, "a plurality of" means two or more than two, unless specified otherwise.

In the description of the present disclosure, it is to be understood unless specified or limited otherwise, terms such as "mounted", "connected" and "coupled" should be understood broadly, and may be, for example, fixed connections, detachable connections, or integral connections; or may be mechanical connections, electrical connections, or mutual communication; or may be direct connections, indirect connections via intervening structures, connections of inner of two elements, or an interaction relationship between two element, which can be understood by those skilled in the art according to specific situations.

In the description of the present disclosure, unless otherwise stipulated and restricted, a structure, in which a first feature is "on" or "below" a second feature may include an embodiment in which the first feature directly contacts the second feature, and may also include an embodiment in which an additional feature is formed between the first feature and the second feature so that the first feature does not directly contact the second feature. Furthermore, a first feature "on", "above" or "on top of" a second feature may include an embodiment in which the first feature is right "on" "above" or "on top of" the second feature, and may also include an embodiment in which the first feature is obliquely "above"" "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

The following description provides a plurality of embodiments or examples configured to achieve different structures of the present disclosure. In order to simplify the publishment of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity, and the repeat does not indicate the relationship of the plurality of embodiments and/or dispositions. Furthermore, examples of different processes and materials are provided in the present disclosure. However, it would be appreciated by those skilled in the art that other processes and/or materials may be also applied.

With reference to FIG. 1, a lens system of Embodiment 1 of the present disclosure comprises a first lens group and a second lens group from an object side to an image side successively. The first lens group comprises a first lens E1, a second lens E2 and a third lens E3 from the object side to the image side successively. The second lens group comprises a fourth lens E4, a fifth lens E5 and a sixth lens E6 from the object side to the image side successively. The first lens E1 has a positive focal power and the object side surface S1 of the first lens E1 is convex. The second lens E2 has a negative focal power and the object side surface S3 of the second lens E2 is convex. The fifth lens E5 has a negative focal power and the image side surface S10 of the fifth lens E5 is convex. The sixth lens E6 has a negative focal power and the object side surface S11 of the sixth lens E6 is concave.

Thus, a size and an aberration of the lens system may be controlled effectively.

In some embodiments, the image side surface S4 of the second lens E2 is concave. The object side surface S9 of the fifth lens E5 is concave. The image side surface S12 of the sixth lens E6 is concave. The lens system satisfies conditional expressions as follows:

$$-6.8 < f4.5.6/Dr7r12 \leq 5; \text{ and}$$

$$-3.2 < f4.5.6/f \leq 3.1.$$

In the above conditions, f4.5.6 represents an effective focal length of the second lens group, Dr7r12 represents an axis distance between the object side surface S7 of the fourth lens E4 and the image side surface S12 of the sixth lens E6, and f represents the effective focal length of the lens system.

Thus, the size and the aberration of the lens system may be controlled in a reasonable scope.

In some embodiments, a lens system also satisfies conditional expressions as follows:

$-6.8 < f4.5.6/Dr7r12 < -3.0$; and $-3.2 < f4.5.6/f < -1.65$.

In these embodiments, the size and the aberration of the lens system is further optimized.

In some embodiments, the image side surface S4 of the second lens E2 is concave. The object side surface S9 of the fifth lens E5 is concave. The image side surface S12 of the sixth lens E6 is concave. The lens system satisfies conditional expressions as follows:

$-18 < f5/f < -4.6$; and $-6 < (R9+R10)/(R9-R10) < 1$.

In the above conditions, f5 represents the effective focal length of the fifth lens E5, R9 represents a curvature radius of the object side surface S9 of the fifth lens E5 and R10 represents the curvature radius of the image side surface S10 of the fifth lens E5.

Thus, the aberration of the lens system, and particularly an astigmatism, can be controlled effectively.

In some embodiments, the image side surface S4 of the second lens E2 is concave. The object side surface S9 of the fifth lens E5 is concave. The image side surface S12 of the sixth lens E6 is concave. The lens system satisfies conditional expressions as follows:

$0.5 < R12/f < 1.5$; and $|(R11+R12)/(R11-R12)| < 1$.

In the above conditions, R11 represents a curvature radius of the object side surface S11 of the sixth lens E6 and R12 represents a curvature radius of the image side surface S12 of the sixth lens E6.

Thus, the aberration of the lens system, and particularly a distortion, may be controlled effectively.

In some embodiments, the image side surface S4 of the second lens E2 is concave, the object side surface S9 of the fifth lens E5 is concave, and the image side surface S12 of the sixth lens E6 is concave. The lens system satisfies conditional expression as follows:

$1.7 < TTL/ImgH < 2.4$.

In the above conditions, TTL represents an overall length of the lens system, ImgH is a half of diagonal length of an effective pixel area on the imaging plane.

Thus, the size and the aberration of the lens system can be controlled effectively.

In some embodiments, the image side surface S2 of the first lens E1 is concave.

In other embodiments, the third lens E3 and the fourth lens E4 have positive focal power, the object side surface S5 of the third lens E3 and the image side surface S6 of the third lens E3 are convex. The object side surface S7 of the fourth lens E4 is concave, while the image side surface S8 of the fourth lens E4 is convex.

In some embodiments, the lens system further comprises an aperture stop set between the object and the second lens E2.

At least one of the lenses of the first lens to the six lenses E1-E6 may be made from plastic, and at least one of the lenses is an aspheric surface lens. In the embodiment of the present disclosure, the first lens to the six lenses E1-E6 are all made from plastic, and all lenses are aspheric surface lenses.

A surface shape of the aspheric surface is defined by a formula as follows:

$$x = \frac{ch^2}{1+\sqrt{1-(k+1)c^2h^2}} + \sum A_i h^i.$$

In the above conditions, h is a height which is from any point on the aspheric surface to an optical axis, c is an apex curvature, k is a conic coefficient, Ai is a aspheric coefficient of an i-th order.

During shooting, a ray is reflected from the object, enters the lens system from the object side emitted from the image side, and then imaged on the imaging plane S15 after passing through an optical filter E7. The optical filter E7 comprises the object side surface S13 and an image side surface S14.

In each specific embodiment below, an effective pixel area of the imaging plane S15 is ¼ inch, and, F number is 1.9. In addition, f1-f6 represent the effective focal length of the first lens to the sixth lens E1-E6 respectively.

Embodiment 1

In Embodiment 1, the lens system satisfies conditions in following tables:

TABLE 1

| Surface | Curvature radius | Thickness | Nd/Vd | Effective diameter | Conic coefficient |
|---|---|---|---|---|---|
| Object | infinity | infinity | | | |
| Aperture stop | infinity | −0.3463 | | 2.0520 | |
| S1 | 1.7315 | 0.5751 | 1.544/56.11 | 2.0386 | −0.7523 |
| S2 | 105.1747 | 0.0412 | | 2.0394 | −99.9900 |
| S3 | 4.0961 | 0.2000 | 1.639/23.29 | 2.0416 | −26.4419 |
| S4 | 1.8607 | 0.3031 | | 2.0644 | −2.3436 |
| S5 | 5.9443 | 0.5722 | 1.544/56.11 | 2.1774 | −32.3093 |
| S6 | −13.5035 | 0.4976 | | 2.3271 | −99.9900 |
| S7 | −4.5991 | 0.5161 | 1.544/56.11 | 2.2973 | −79.7199 |
| S8 | −1.4268 | 0.0499 | | 2.5752 | −0.4317 |
| S9 | −12.7398 | 0.3419 | 1.635/23.78 | 2.6398 | −99.9900 |
| S10 | −100.9446 | 0.3579 | | 3.0555 | −87.8474 |
| S11 | −1.9338 | 0.2999 | 1.544/56.11 | 3.1143 | −0.8711 |
| S12 | 3.7376 | 0.0872 | | 3.9087 | −57.2159 |
| S13 | infinity | 0.2100 | 1.517/64.17 | 4.1828 | |
| S14 | infinity | 0.5500 | | 4.3006 | |
| S15 | infinity | 0.0000 | | 4.8047 | |

TABLE 2

| Surface | A4 | A6 | A8 | A10 | A12 | A14 | A16 |
|---|---|---|---|---|---|---|---|
| S1 | 1.8500E−02 | −1.5157E−04 | 1.0029E−02 | −2.2170E−03 | 0 | 0 | 0 |
| S2 | 3.1273E−02 | −1.6429E−02 | 2.4010E−02 | −1.9834E−02 | 0 | 0 | 0 |
| S3 | −9.7794E−03 | 3.7397E−03 | 1.6834E−02 | −2.9046E−02 | 0 | 0 | 0 |

TABLE 2-continued

| Surface | A4 | A6 | A8 | A10 | A12 | A14 | A16 |
|---|---|---|---|---|---|---|---|
| S4 | −3.4143E−02 | 5.5917E−02 | −1.8261E−02 | 2.4954E−03 | 0 | 0 | 0 |
| S5 | 1.1485E−02 | −2.6093E−02 | 3.3606E−04 | 8.3202E−03 | 0 | 0 | 0 |
| S6 | −2.1314E−02 | −3.8473E−02 | −1.5765E−02 | 5.1413E−03 | 0 | 0 | 0 |
| S7 | −5.6157E−02 | 3.9049E−02 | −3.5111E−02 | −2.7692E−02 | 2.3711E−03 | 4.4269E−07 | −2.8079E−04 |
| S8 | 1.5206E−01 | −3.4903E−02 | −1.2115E−02 | −2.6856E−03 | −1.3532E−03 | 2.9716E−04 | 1.0036E−03 |
| S9 | −1.3131E−01 | 2.7250E−01 | −3.7794E−01 | 2.2665E−01 | −5.5451E−02 | −7.0980E−03 | 4.2217E−03 |
| S10 | −1.8693E−01 | 2.9956E−01 | −3.4572E−01 | 2.2626E−01 | −8.6700E−02 | 1.7890E−02 | −1.5181E−03 |
| S11 | 1.4835E−01 | 1.9790E−01 | −1.8593E−01 | 1.1837E−01 | −4.2587E−02 | 7.7344E−03 | −5.5080E−04 |
| S12 | −7.5410E−02 | 3.6996E−02 | −1.3944E−02 | 3.0629E−03 | −3.0813E−04 | −1.6185E−06 | 1.5727E−06 |

In addition, TTL=4.6 mm, f1=3.245 mm, f2=−5.589 mm, f3=7.703 mm, f4=3.614 mm, f5=−23.232 mm, f6=−2.311 mm and f=3.87 mm.

Figure 5:
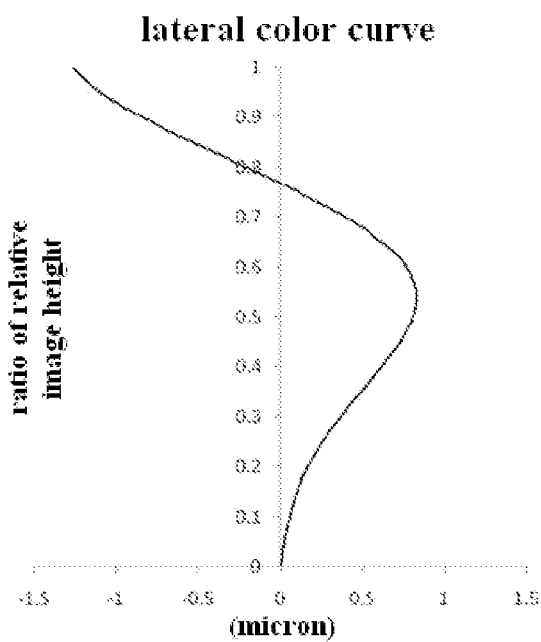
FIG. 5 is a lateral color chart (mm) of a lens system according to Embodiment 1 of the present disclosure.

FIG. 2 is a longitudinal aberration chart (mm) of a lens system according to Embodiment 1 of the present disclosure, FIG. 3 is an astigmatism chart (mm) of a lens system according to Embodiment 1 of the present disclosure, FIG. 4 is a distortion chart (%) of a lens system according to Embodiment 1 of the present disclosure, and FIG. 5 is a lateral color chart (mm) of a lens system according to Embodiment 1 of the present disclosure. It can be seen that, the aberration of the lens system is effectively controlled.

Embodiment 2

Figure 6:
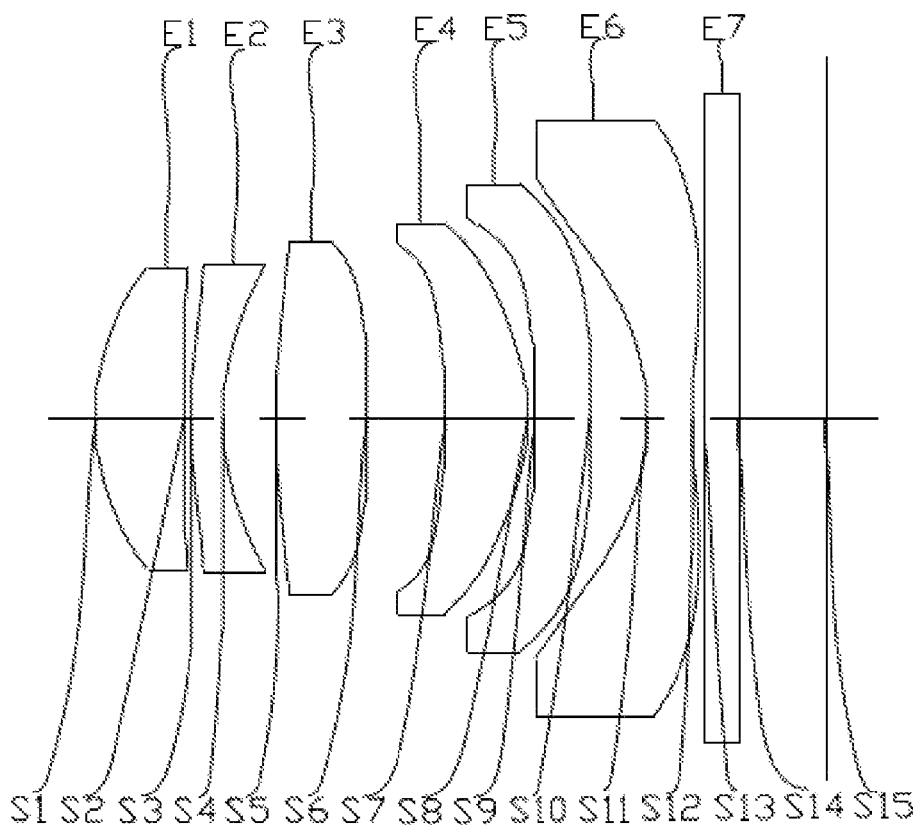
FIG. 6 is a schematic diagram of a lens system according to Embodiment 2 of the present disclosure.

FIG. 6 is a schematic diagram of a lens system according to Embodiment 2 of the present disclosure. In Embodiment 2, the lens system satisfies conditions in following tables:

TABLE 3

| Surface | Curvature radius | Thickness | Nd/Vd | Effective diameter | Conic coefficient |
|---|---|---|---|---|---|
| object | infinity | infinity | | | |
| Aperture stop | infinity | −0.2711 | | 2.0667 | |
| S1 | 1.7269 | 0.5587 | 1.544/56.11 | 2.0005 | −0.7326 |
| S2 | 98.0715 | 0.0471 | | 2.0062 | −6213.6579 |
| S3 | 3.9515 | 0.1991 | 1.639/23.290 | 2.0092 | −27.6486 |
| S4 | 1.8172 | 0.3353 | | 2.0380 | −2.3221 |
| S5 | 5.9119 | 0.5688 | 1.544/56.11 | 2.1951 | −31.5255 |
| S6 | −13.1599 | 0.4944 | | 2.3464 | −76.8557 |
| S7 | −4.8067 | 0.5212 | 1.544/56.11 | 2.3253 | −81.3363 |
| S8 | −1.4205 | 0.0427 | | 2.6002 | −0.4103 |
| S9 | −11.7951 | 0.3522 | 1.635/23.78 | 2.6612 | −68.5955 |
| S10 | −84.6473 | 0.3558 | | 3.1125 | 1902.0489 |
| S11 | −2.0417 | 0.2931 | 1.544/56.11 | 3.2023 | −0.8108 |
| S12 | 3.7013 | 0.0733 | | 3.9596 | −46.2955 |
| S13 | infinity | 0.2100 | 1.517/64.17 | 4.2116 | |
| S14 | infinity | 0.5500 | | 4.3161 | |
| S15 | infinity | | | 4.8066 | |

In addition, TTL=4.6 mm, f1=3.24 mm, f2=−5.523 mm, f3=7.614 mm, f4=3.533 mm, f5=−21.846 mm, f6=−2.387 mm and f=3.8 mm.

FIG. 7 is a longitudinal aberration chart (mm) of a lens system according to Embodiment 2 of the present disclosure, FIG. 8 is an astigmatism chart (mm) of a lens system according to Embodiment 2 of the present disclosure, FIG. 9 is a distortion chart (%) of a lens system according to Embodiment 2 of the present disclosure, and FIG. 10 is a lateral color chart (mm) of a lens system according to Embodiment 2 of the present disclosure. Thus it can be seen that, the aberration of the lens system is effectively controlled.

Embodiment 3

Figure 11:
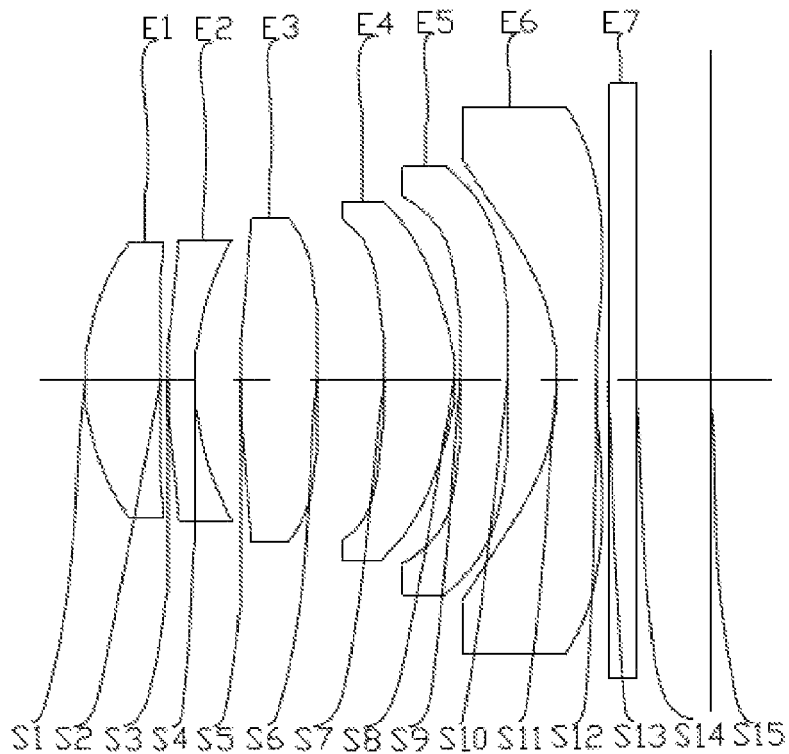
FIG. 11 is a schematic diagram of a lens system according to Embodiment 3 of the present disclosure.

FIG. 11 is a schematic diagram of a lens system according to Embodiment 3 of the present disclosure. In Embodiment 3, the lens system satisfies conditions in following tables:

TABLE 5

| Surface | Curvature radius | Thickness | Nd/Vd | Effective diameter | Conic coefficient |
|---|---|---|---|---|---|
| Object | infinity | infinity | | | |
| Aperture stop | infinity | −0.3013 | | 2.0167 | |
| S1 | 1.7305 | 0.5543 | 1.544, 56.11 | 1.9926 | −0.7259 |
| S2 | 94.8110 | 0.0536 | | 1.9997 | −7863.7917 |
| S3 | 3.9334 | 0.2005 | 1.639/23.290 | 2.0034 | −27.6191 |
| S4 | 1.7999 | 0.3362 | | 2.0368 | −2.3259 |
| S5 | 5.7223 | 0.5634 | 1.544/56.11 | 2.1971 | −32.7961 |
| S6 | −15.8366 | 0.4915 | | 2.3515 | −77.9093 |
| S7 | −4.9586 | 0.5240 | 1.544/56.11 | 2.3369 | −87.3037 |
| S8 | −1.4080 | 0.0430 | | 2.6075 | −0.4043 |
| S9 | −12.7335 | 0.3534 | 1.635/23.78 | 2.6763 | −111.2278 |
| S10 | −81.0968 | 0.3578 | | 3.1140 | 1527.0712 |
| S11 | −2.0782 | 0.2936 | 1.544/56.11 | 3.2176 | −0.7652 |
| S12 | 3.6095 | 0.0831 | | 3.9765 | −40.7437 |
| S13 | infinity | 0.2100 | 1.517/64.17 | 4.2175 | |
| S14 | infinity | 0.5500 | | 4.3193 | |
| S15 | infinity | | | 4.8053 | |

TABLE 4

| Surface | A4 | A6 | A8 | A10 | A12 | A14 | A16 |
|---|---|---|---|---|---|---|---|
| S1 | 1.9036E−02 | 1.8470E−04 | 9.9584E−03 | −2.1704E−03 | 0 | 0 | 0 |
| S2 | 3.0719E−02 | −1.7090E−02 | 2.3245E−02 | −2.1607E−02 | 0 | 0 | 0 |
| S3 | −1.0364E−02 | 2.8498E−03 | 1.5066E−02 | −3.1063E−01 | 0 | 0 | 0 |
| S4 | −3.3902E−02 | 5.6075E−02 | −1.7678E−02 | 2.3619E−03 | 0 | 0 | 0 |
| S5 | 1.1841E−02 | 2.6158E−02 | −2.5820E−04 | 8.1404E−03 | 0 | 0 | 0 |
| S6 | −2.1658E−02 | −3.8162E−02 | −1.5557E−02 | 4.8935E−03 | 0 | 0 | 0 |
| S7 | −5.5446E−02 | 3.8918E−02 | −3.5320E−02 | −2.7690E−02 | 2.5846E−03 | 4.0967E−04 | 1.2405E−04 |
| S8 | 1.4979E−01 | −3.5712E−02 | −1.2351E−02 | −2.6844E−03 | −1.2997E−03 | 3.4405E−04 | 1.0319E−03 |
| S9 | −1.3290E−01 | 2.7199E−01 | −3.7790E−01 | 2.2657E−01 | −5.5531E−02 | −7.1221E−03 | 4.2329E−03 |
| S10 | −1.8772E−01 | 2.9991E−01 | −3.4562E−01 | 2.2627E−01 | −8.6701E−02 | 1.7888E−02 | −1.5195E−03 |
| S11 | −1.4931E−01 | 1.9761E−01 | −1.8593E−01 | 1.1840E−01 | −4.2574E−02 | 7.7383E−03 | −5.5035E−04 |
| S12 | −7.6326E−02 | 3.6954E−02 | −1.3977E−02 | 3.0557E−03 | −3.0897E−04 | −1.5714E−06 | 1.6326E−06 |

TABLE 6

| Surface | A4 | A6 | A8 | A10 | A12 | A14 | A16 |
|---|---|---|---|---|---|---|---|
| S1 | 1.9220E−02 | 3.2194E−04 | 9.9236E−03 | −2.2206E−03 | 0 | 0 | 0 |
| S2 | 3.0634E−02 | −1.7042E−02 | 2.3240E−02 | −2.2146E−02 | 0 | 0 | 0 |
| S3 | −1.0445E−02 | 2.4311E−03 | 1.4312E−02 | −3.1776E−02 | 0 | 0 | 0 |
| S4 | −3.3947E−02 | 5.6091E−02 | −1.7708E−02 | 1.8083E−03 | 0 | 0 | 0 |
| S5 | 1.1465E−02 | −2.6508E−02 | −4.9908E−04 | 8.2197E−03 | 0 | 0 | 0 |
| S6 | −2.1570E−02 | −3.8087E−02 | −1.5657E−02 | 4.6067E−03 | 0 | 0 | 0 |
| S7 | −5.5540E−02 | 3.8852E−02 | −3.5177E−02 | −2.7539E−02 | 2.7376E−03 | 5.6419E−04 | 2.6971E−04 |
| S8 | 1.4884E−01 | −3.5810E−02 | −1.2416E−02 | −2.6622E−03 | −1.2461E−03 | 3.9333E−04 | 1.0694E−03 |
| S9 | −1.3283E−01 | 2.7129E−01 | −3.7775E−01 | 2.2667E−01 | −5.5510E−02 | −7.1115E−03 | 4.2445E−03 |
| S10 | 1.8980E−01 | 2.9994E−01 | −3.4567E−01 | 2.2625E−01 | −8.6709E−02 | 1.7884E−02 | −1.5205E−03 |
| S11 | −1.5021E−01 | 1.9758E−01 | −1.8589E−01 | 1.1840E−01 | −4.2565E−02 | 7.7376E−03 | −5.5126E−04 |
| S12 | −7.5194E−02 | 3.6861E−02 | −1.3994E−02 | 3.0531E−03 | −3.0912E−04 | −1.4856E−06 | 1.6802E−06 |

In addition, TTL=4.61 mm, f1=3.249 mm, f2=−5.449 mm, f3=7.836 mm, f4=3.453 mm, f5=−24.082 mm, f6=−2.393 mm and f=3.786 mm.

Figure 12:
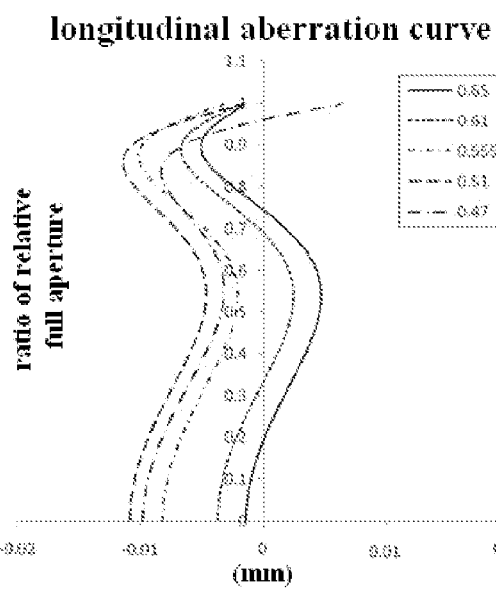
FIG. 12 is a longitudinal aberration chart (mm) of a lens system according to Embodiment 3 of the present disclosure.
Figure 13:
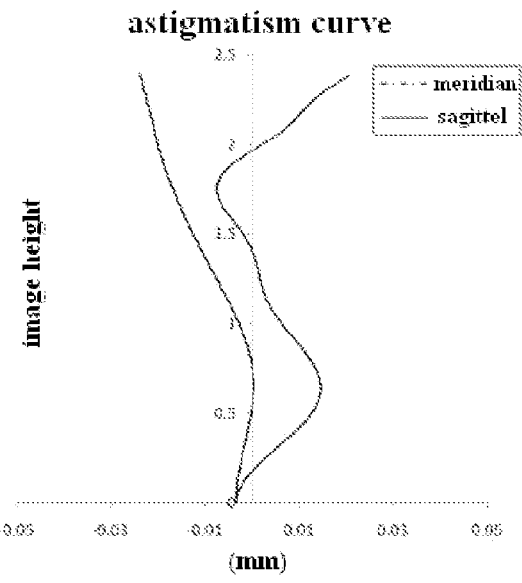
FIG. 13 is an astigmatism chart (mm) of a lens system according to Embodiment 3 of the present disclosure.
Figure 14:
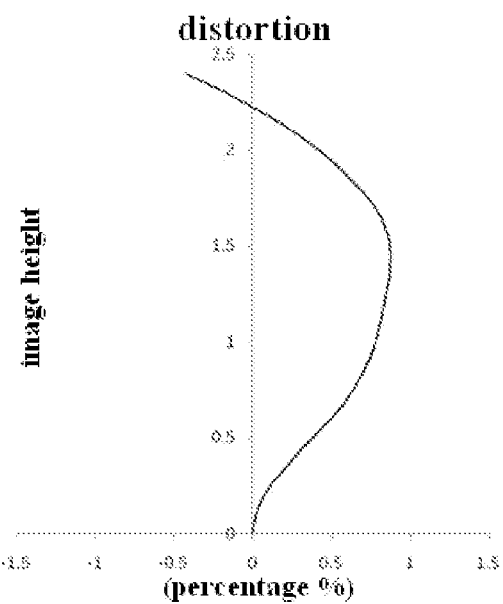
FIG. 14 is a distortion chart (%) of a lens system according to Embodiment 3 of the present disclosure.
Figure 15:
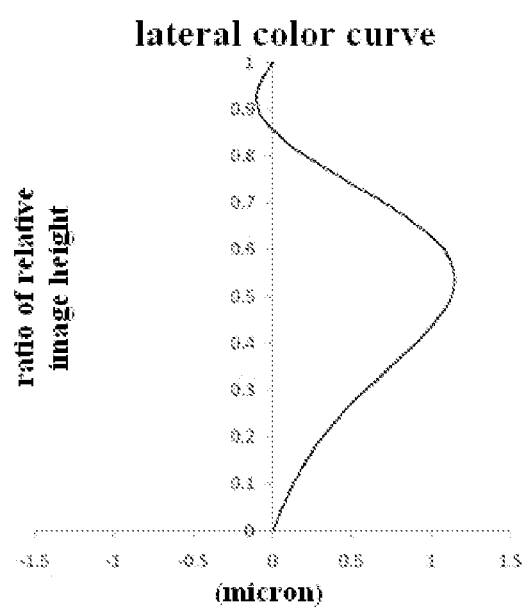
FIG. 15 is a lateral color chart (mm) of a lens system according to Embodiment 3 of the present disclosure.

FIG. 12 is a longitudinal aberration chart (mm) of a lens system according to Embodiment 3 of the present disclosure, FIG. 13 is an astigmatism chart (mm) of a lens system according to Embodiment 3 of the present disclosure, FIG. 14 is a distortion chart (%) of a lens system according to Embodiment 3 of the present disclosure, and FIG. 15 is a lateral color chart (mm) of a lens system according to Embodiment 3 of the present disclosure. Thus it can be seen that, the aberration of the lens system is effectively controlled.

Embodiment 4

Figure 16:
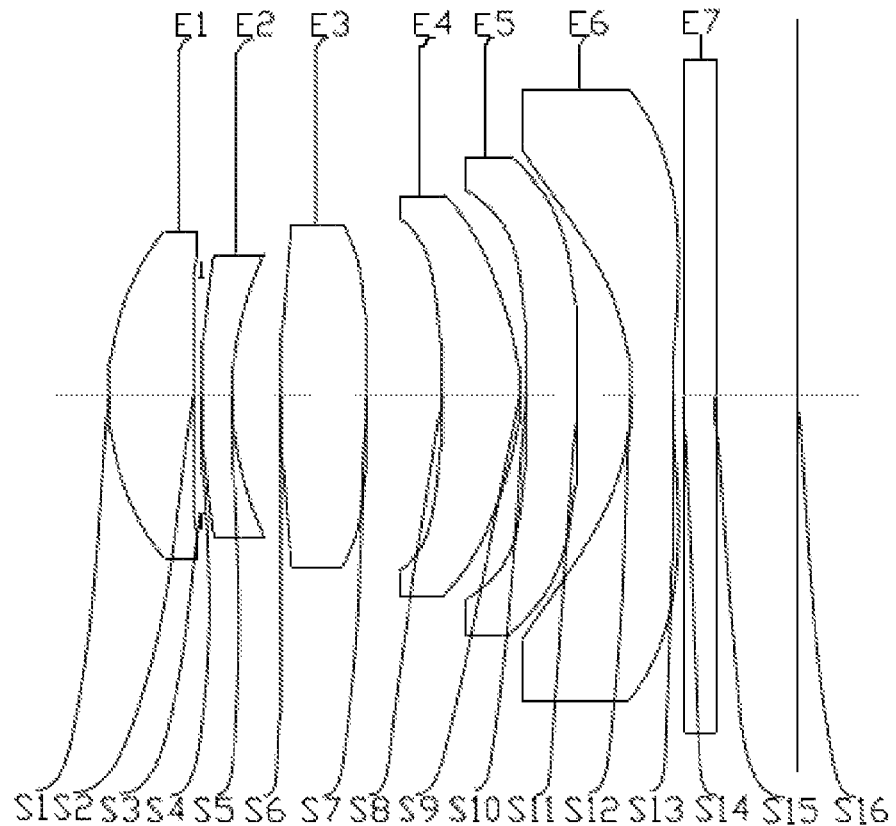
FIG. 16 is a schematic diagram of a lens system according to Embodiment 4 of the present disclosure.

FIG. 16 is a schematic diagram of a lens system according to Embodiment 4 of the present disclosure. In Embodiment 4, the lens system satisfies conditions in following tables:

TABLE 7

| Surface | Curvatures radius | Thickness | Nd/Vd | Effective diameter | Conic coefficient |
|---|---|---|---|---|---|
| Object | infinity | infinity | | | |
| S1 | 1.7261 | 0.5698 | 1.544, 56.11 | 2.1145 | −0.7458 |
| S2 | 89.6495 | 0.0418 | | 1.8061 | −2021.1119 |
| Aperture stop | infinity | 0.0106 | | 1.7351 | |
| S3 | 3.9699 | 0.2029 | 1.639/23.290 | 1.7661 | −26.5124 |
| S4 | 1.8339 | 0.3217 | | 1.8203 | −2.3500 |
| S5 | 5.9075 | 0.5730 | 1.544/56.11 | 2.0121 | −34.0263 |
| S6 | −13.6218 | 0.5016 | | 2.2128 | −92.5178 |
| S7 | −4.7551 | 0.5183 | 1.544/56.11 | 2.2820 | −74.1939 |
| S8 | −1.4234 | 0.0439 | | 2.5802 | −0.4202 |
| S9 | −12.7950 | 0.3381 | 1.635/23.78 | 2.6608 | −119.3865 |
| S10 | −98.0822 | 0.3545 | | 3.0893 | 3564.9061 |

TABLE 7-continued

| Surface | Curvatures radius | Thickness | Nd/Vd | Effective diameter | Conic coefficient |
|---|---|---|---|---|---|
| S11 | −1.9730 | 0.2868 | 1.544/56.11 | 3.1671 | −0.8055 |
| S12 | 3.7829 | 0.0686 | | 3.9546 | −52.2738 |
| S13 | infinity | 0.2100 | 1.517/64.17 | 4.2486 | |
| S14 | infinity | 0.5500 | | 4.3546 | |
| S15 | infinity | | | 4.8577 | |

TABLE 8

| Surface | A4 | A6 | A8 | A10 | A12 | A14 | A16 |
|---|---|---|---|---|---|---|---|
| S1 | 1.8645E−02 | 3.5010E−04 | 1.0379E−02 | −2.1429E−03 | 0 | 0 | 0 |
| S2 | 3.1074E−02 | −1.6584E−02 | 2.4144E−02 | −2.0038E−02 | 0 | 0 | 0 |
| S3 | −9.6573E−02 | 3.8168E−03 | 1.6161E−02 | −3.0600E−02 | 0 | 0 | 0 |
| S4 | −3.4317E−02 | 5.5364E−02 | −1.8330E−02 | 2.4888E−03 | 0 | 0 | 0 |
| S5 | 1.1053E−02 | −2.6526E−02 | 3.8406E−04 | 7.8958E−03 | 0 | 0 | 0 |
| S6 | −2.1508E−02 | −3.8565E−02 | −1.5874E−02 | 4.8592E−03 | 0 | 0 | 0 |
| S7 | −5.5343E−02 | 3.8995E−02 | −3.5590E−02 | −2.8003E−02 | 2.2838E−03 | 4.6888E−05 | −1.8987E−04 |
| S8 | 1.5037E−01 | −3.4998E−02 | −1.2017E−02 | −2.6057E−03 | −1.2927E−03 | 3.4189E−04 | 1.0361E−03 |
| S9 | −1.3219E−01 | 2.7158E−01 | −3.7784E−01 | 2.2681E−01 | −5.5396E−02 | −7.0912E−03 | 4.2174E−03 |
| S10 | 1.8789E−01 | 2.9944E−01 | −3.4584E−01 | 2.2623E−01 | −8.6703E−02 | 1.7891E−02 | −1.5176E−03 |
| S11 | −1.4958E−01 | 1.9758E−01 | −1.8597E−01 | 1.1837E−01 | −4.2584E−02 | 7.7366E−03 | −5.4948E−04 |
| S12 | −7.6991E−02 | 3.6643E−02 | −1.4010E−02 | 3.0535E−03 | −3.0908E−04 | −1.6555E−06 | 1.5819E−06 |

In addition, TTL=4.59 mm, f1=3.22 mm, f2=−5.497 mm, f3=7.627 mm, f4=3.527 mm, f5=−23.016 mm, f6=−2.334 mm and f=3.787 mm.

FIG. 17 is a longitudinal aberration chart (mm) of a lens system according to Embodiment 4 of the present disclosure, FIG. 18 is an astigmatism chart (mm) of a lens system, FIG. 19 is a distortion chart (%) of a lens system according to Embodiment 4 of the present disclosure, and FIG. 20 is a lateral color chart (mm) of a lens system according to Embodiment 4 of the present disclosure. Thus it can be seen that, the aberration of the lens system is effectively controlled.

Embodiment 5

FIG. 21 is a schematic diagram of a lens system according to Embodiment 5 of the present disclosure. In Embodiment 5, the lens system satisfies conditions in following tables:

TABLE 9

| Surface | Curvature radius | Thickness | Material | Effective diameter | Conic coefficient |
|---|---|---|---|---|---|
| Object | infinity | infinity | | | |
| Aperture stop + S1 | 1.7312 | 0.5945 | APL5514 | 0.9870 | −0.7646 |
| S2 | −303.1921 | 0.0485 | | 0.9941 | −412.8600 |
| S3 | 3.9054 | 0.2003 | SP3810 | 0.9993 | −28.9499 |
| S4 | 1.8001 | 0.2866 | | 1.0140 | −2.3020 |
| S5 | 5.4411 | 0.5904 | APL5514 | 1.0648 | −32.7130 |
| S6 | −16.7652 | 0.4889 | | 1.1547 | −50.6311 |
| S7 | −4.6466 | 0.5031 | APL5514 | 1.1622 | −70.4529 |
| S8 | −1.3791 | 0.0521 | | 1.2947 | −0.4523 |
| S9 | −7.2875 | 0.3026 | EP5000 | 1.3283 | −145.5337 |
| S10 | −22.6170 | 0.3638 | | 1.5166 | 99.6853 |
| S11 | −1.8809 | 0.2986 | APL5514 | 1.5395 | −1.2508 |
| S12 | 4.8391 | 0.0822 | | 1.9680 | −50.4918 |
| S13 | infinity | 0.2100 | BK7 | 2.1401 | |
| S14 | infinity | 0.5295 | | 2.2051 | |
| S15 | infinity | | | 2.5133 | |

TABLE 10

| Surface | A4 | A6 | A8 | A10 | A12 | A14 | A16 |
|---|---|---|---|---|---|---|---|
| S1 | 1.8578E−02 | −6.5199E−06 | 9.8872E−03 | −2.3825E−03 | −2.0718E−04 | 2.2764E−04 | 2.6376E−04 |
| S2 | 3.1198E−02 | −1.6272E−02 | 2.4135E−02 | −1.9716E−02 | −3.3901E−04 | 1.8417E−05 | 2.0630E−04 |
| S3 | −9.6536E−03 | 3.8437E−03 | 1.7000E−02 | −2.9520E−02 | 1.2353E−05 | 1.8858E−05 | 6.1675E−05 |
| S4 | −3.2795E−02 | 5.6798E−02 | −1.7622E−02 | 3.0086E−03 | −3.9567E−04 | −2.8502E−04 | −4.8017E−04 |
| S5 | 1.1369E−02 | −2.6659E−02 | −6.9482E−05 | 8.1661E−03 | −2.9154E−04 | 1.7439E−04 | 2.2938E−04 |
| S6 | −2.1413E−02 | −3.8351E−02 | −1.5349E−02 | 5.5705E−03 | 3.1454E−05 | −4.7087E−05 | −7.4609E−05 |
| S7 | −5.6968E−02 | 3.9996E−02 | −3.4040E−02 | −2.6964E−02 | 3.0189E−03 | 6.9765E−04 | −5.7516E−05 |
| S8 | 1.5773E−01 | −3.4244E−02 | −1.2324E−02 | −2.7518E−03 | −1.2215E−03 | 4.5126E−04 | 8.1035E−04 |
| S9 | −1.3345E−01 | 2.7584E−01 | −3.8105E−01 | 2.2740E−01 | −5.4481E−02 | −7.2139E−03 | 4.1347E−03 |
| S10 | −1.8478E−01 | 2.9838E−01 | −3.4480E−01 | 2.2640E−01 | −8.6697E−02 | 1.7868E−02 | −1.5254E−03 |
| S11 | −1.5661E−01 | 1.9565E−01 | −1.8618E−01 | 1.1860E−01 | −4.2538E−02 | 7.7351E−03 | −5.6227E−04 |
| S12 | −7.2215E−02 | 3.4877E−02 | −1.3948E−02 | 3.0964E−03 | −3.0400E−04 | −1.2003E−06 | 1.6085E−06 |

In addition, TTL=4.55 mm, f1=3.18 mm, f2=−5.49 mm, f3=7.66 mm, f4=3.44 mm, f5=−17.24 mm, f6=−2.46 mm and f=3.74 mm.

FIG. 22 is a longitudinal aberration chart (mm) of a lens system according to Embodiment 5 of the present disclosure, FIG. 23 is an astigmatism chart (mm) of a lens system according to Embodiment 5 of the present disclosure, FIG. 24 is a distortion chart (%) of a lens system according to Embodiment 5 of the present disclosure, and FIG. 25 is a lateral color chart (mm) of a lens system according to Embodiment 5 of the present disclosure. Thus it can be seen that, the aberration of the lens system is effectively controlled.

Embodiment 6

FIG. 26 is a schematic diagram of a lens system according to Embodiment 6 of the present disclosure. In Embodiment 6, the lens system satisfies conditions in following tables:

TABLE 11

| Surface | Curvature radius | Thickness | Material | Effective diameter | Conic coefficient |
|---|---|---|---|---|---|
| Object | infinity | infinity | | | |
| Aperture stop + S1 | 1.7413 | 0.5323 | APL5514 | 0.9890 | −0.7096 |
| S2 | −85.4711 | 0.0485 | | 0.9946 | 95.8421 |
| S3 | 3.9521 | 0.2012 | SP3810 | 1.0003 | −32.3834 |
| S4 | 1.8047 | 0.3291 | | 1.0171 | −2.4596 |
| S5 | 5.7220 | 0.4282 | APL5514 | 1.1019 | −28.5819 |
| S6 | −8.2257 | 0.4730 | | 1.1364 | −105.6520 |
| S7 | −4.1236 | 0.5160 | APL5514 | 1.1232 | −84.9945 |
| S8 | −1.5322 | 0.0157 | | 1.2574 | −0.4156 |
| S9 | −14.0851 | 0.3486 | EP5000 | 1.2733 | 64.5845 |
| S10 | −23.4420 | 0.3992 | | 1.4867 | 40.6951 |
| S11 | −1.8130 | 0.2653 | APL5514 | 1.4876 | −0.6569 |
| S12 | 3.1448 | 0.0989 | | 1.9069 | −32.2187 |
| S13 | infinity | 0.2100 | BK7 | 2.0978 | |
| S14 | infinity | 0.5500 | | 2.1577 | |
| S15 | infinity | | | 2.4103 | |

TABLE 12

| Surface | A4 | A6 | A8 | A10 | A12 | A14 | A16 |
|---|---|---|---|---|---|---|---|
| S1 | 1.9260E−02 | 3.4299E−04 | 1.0151E−02 | −3.0947E−03 | 0 | 0 | 0 |
| S2 | 3.8585E−02 | −1.4292E−02 | 2.3147E−02 | −2.0863E−02 | 0 | 0 | 0 |
| S3 | −9.9769E−03 | 7.1212E−03 | 1.8157E−02 | −3.1825E−02 | 0 | 0 | 0 |
| S4 | −3.6885E−02 | 5.0168E−02 | −1.8371E−02 | 6.6835E−03 | 0 | 0 | 0 |
| S5 | 1.2624E−02 | −2.5031E−02 | 9.1403E−04 | 8.1212E−03 | 0 | 0 | 0 |
| S6 | −2.2244E−02 | −3.9115E−02 | −1.6390E−02 | 4.2647E−03 | 0 | 0 | 0 |
| S7 | −5.8495E−02 | 3.9749E−02 | −3.4313E−02 | −2.7532E−02 | 2.3200E−03 | 2.5313E−04 | 1.4876E−04 |
| S8 | 1.5025E−01 | −3.5840E−02 | −1.2264E−02 | −2.4831E−03 | −1.1626E−03 | 3.9301E−04 | 1.0370E−03 |
| S9 | −1.3042E−01 | 2.7220E−01 | −3.7813E−01 | 2.2627E−01 | −5.5659E−02 | −7.1284E−03 | 4.2719E−03 |
| S10 | −1.8585E−01 | 3.0264E−01 | −3.4507E−01 | 2.2635E−01 | −8.6667E−02 | 1.7901E−02 | −1.5098E−03 |
| S11 | −1.5469E−01 | 1.9754E−01 | −1.8588E−01 | 1.1844E−01 | −4.2544E−02 | 7.7692E−03 | −5.5161E−04 |
| S12 | −8.7704E−02 | 3.6693E−02 | −1.3944E−02 | 3.0628E−03 | −3.1089E−04 | −1.9762E−06 | 1.6227E−06 |

In addition, TTL=3.72 mm, f1=3.13 mm, f2=−5.35 mm, f3=6.25 mm, f4=417 mm, f5=−55.93 mm, f6=−2.07 mm and f=3.76 mm.

Figure 27:
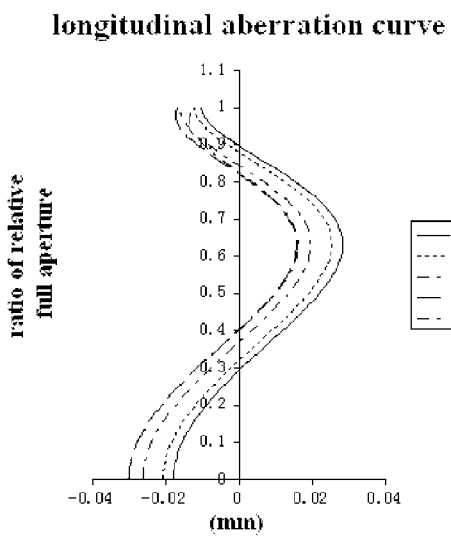
FIG. 27 is a longitudinal aberration chart (mm) of a lens system according to Embodiment 6 of the present disclosure.
Figure 28:
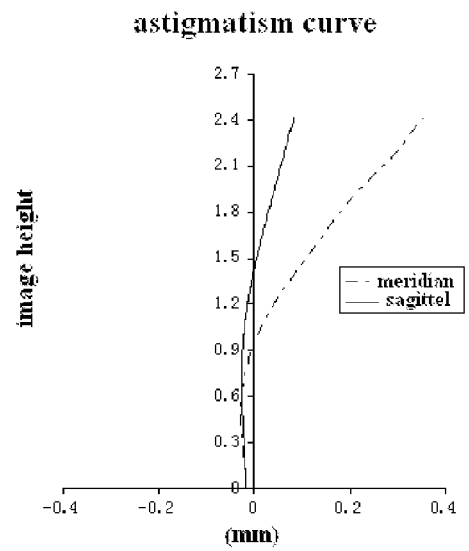
FIG. 28 is an astigmatism chart (mm) of a lens system according to Embodiment 6 of the present disclosure.
Figure 29:
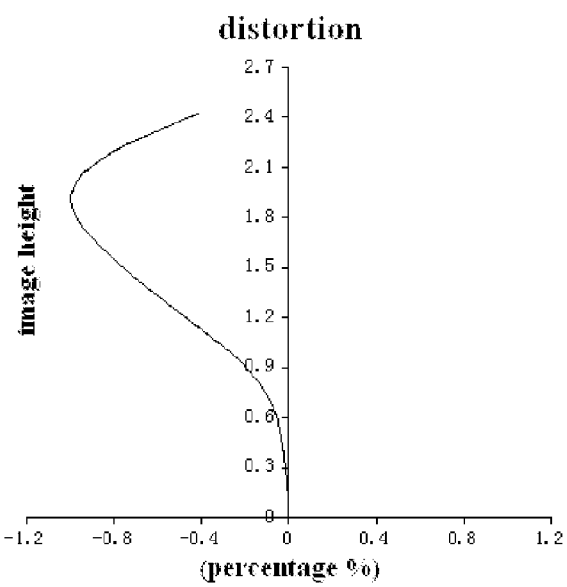
FIG. 29 is a distortion chart (%) of a lens system according to Embodiment 6 of the present disclosure.
Figure 30:
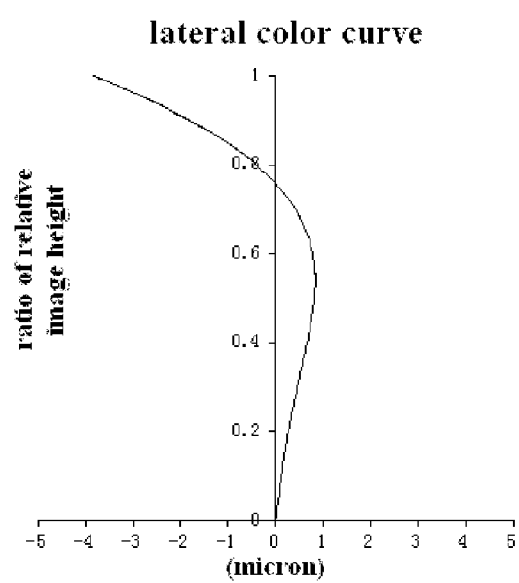
FIG. 30 is a lateral color chart (mm) of a lens system according to Embodiment 6 of the present disclosure.

FIG. 27 is a longitudinal aberration chart (mm) of a lens system according to Embodiment 6 of the present disclosure, FIG. 28 is an astigmatism chart (mm) of a lens system according to Embodiment 6 of the present disclosure, FIG. 29 is a distortion chart (%) of a lens system according to Embodiment 6 of the present disclosure, and FIG. 30 is a lateral color chart (mm) of a lens system. Thus it can be seen that, the aberration of the lens system is effectively controlled.

Embodiment 7

Figure 31:
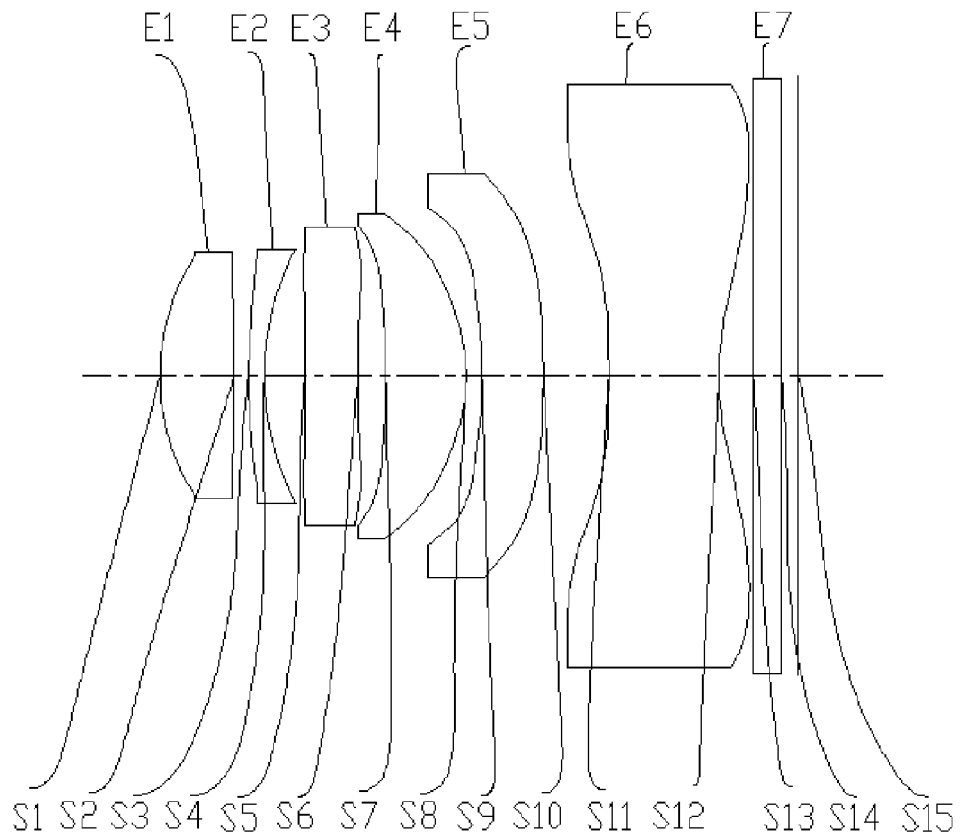
FIG. 31 is a schematic diagram of a lens system according to Embodiment 7 of the present disclosure.

FIG. 31 is a schematic diagram of a lens system according to Embodiment 7 of the present disclosure. In Embodiment 7, the lens system satisfies conditions in following tables:

TABLE 13

| Surface | Curvature radius | D | Material | Effective diameter | Conic coefficient |
|---|---|---|---|---|---|
| Object | infinity | infinity | | | |
| Aperture stop + S1 | 1.7900 | 0.5711 | APL5514 | 0.9398 | −0.7224 |
| S2 | −15.5637 | 0.1129 | | 0.9567 | −4.6095 |
| S3 | 4.4374 | 0.1238 | SP3810 | 0.9752 | −27.6966 |
| S4 | 2.0206 | 0.3102 | | 0.9861 | −2.0500 |
| S5 | −479.3221 | 0.4197 | APL5514 | 1.0424 | 99.9951 |
| S6 | 12.1728 | 0.2092 | | 1.1587 | 96.8937 |
| S7 | −7.6995 | 0.6241 | APL5514 | 1.1659 | −489.6905 |
| S8 | −1.3880 | 0.1245 | | 1.2629 | −0.2522 |
| S9 | −4.2540 | 0.4751 | EP5000 | 1.3067 | −80.5928 |
| S10 | −6.4050 | 0.5071 | | 1.5652 | −1000.0001 |
| S11 | −20.5234 | 0.8569 | APL5514 | 1.8590 | −33.2887 |
| S12 | 2.2040 | 0.2671 | | 2.2610 | −1.1043 |
| S13 | infinity | 0.2100 | BK7 | 2.2877 | |
| S14 | infinity | 0.1374 | | 2.3083 | |
| S15 | infinity | | | 2.3290 | |

TABLE 14

| Surface | A4 | A6 | A8 | A10 | A12 | A14 | A16 |
|---|---|---|---|---|---|---|---|
| S1 | 2.1963E−02 | −6.3834E−04 | 9.4309E−03 | −2.5381E−03 | 9.3235E−04 | 4.1989E−04 | 8.7399E−05 |
| S2 | 2.8775E−02 | −1.5763E−02 | 2.5897E−02 | −1.7439E−02 | 9.3646E−02 | 6.6601E−04 | −5.2213E−04 |
| S3 | −1.1124E−02 | 3.4264E−03 | 1.7672E−02 | −2.8170E−02 | 7.9864E−04 | 8.9530E−04 | 2.0032E−03 |
| S4 | −2.8339E−02 | 5.9147E−02 | −1.7444E−02 | 1.2215E−03 | 1.8031E−03 | 3.5764E−03 | 4.7848E−03 |
| S5 | 1.4720E−03 | −2.7229E−02 | 3.1826E−03 | 1.3488E−02 | 5.8560E−03 | 3.9143E−03 | 7.3019E−04 |
| S6 | −3.0056E−03 | −3.8000E−02 | −1.3984E−02 | 7.7940E−03 | 1.4118E−03 | 3.7432E−04 | −9.1934E−04 |
| S7 | −6.6739E−02 | 3.3157E−02 | −3.2029E−02 | −2.2816E−02 | 6.2149E−03 | 2.9884E−03 | 1.4971E−03 |
| S8 | 1.0755E−01 | −3.7866E−02 | −1.1263E−02 | −1.5252E−03 | −5.2658E−04 | 7.7263E−04 | 9.5539E−04 |
| S9 | −1.2536E−01 | 2.7481E−01 | −3.7960E−01 | 2.2460E−01 | −5.6386E−02 | −6.9586E−03 | 4.6371E−03 |
| S10 | 1.9257E−01 | 2.9889E−01 | −3.4466E−01 | 2.2653E−01 | −8.6701E−02 | 1.7885E−02 | −1.5054E−03 |
| S11 | −1.8378E−01 | 1.9485E−01 | −1.8529E−01 | 1.1890E−01 | −4.2460E−02 | 7.7471E−03 | −5.6740E−04 |
| S12 | −9.8110E−02 | 3.8266E−02 | −1.3718E−02 | 3.0710E−03 | −3.1364E−04 | −1.6462E−06 | 1.7296E−06 |

In addition, TTL=4.95 mm, f1=2.98 mm, f2=−5.88 mm, f3=−21.74 mm, f4=3 mm, f5=−21.65 mm, f6=−3.6 mm and f=3.57 mm.

Figures 32, 33:
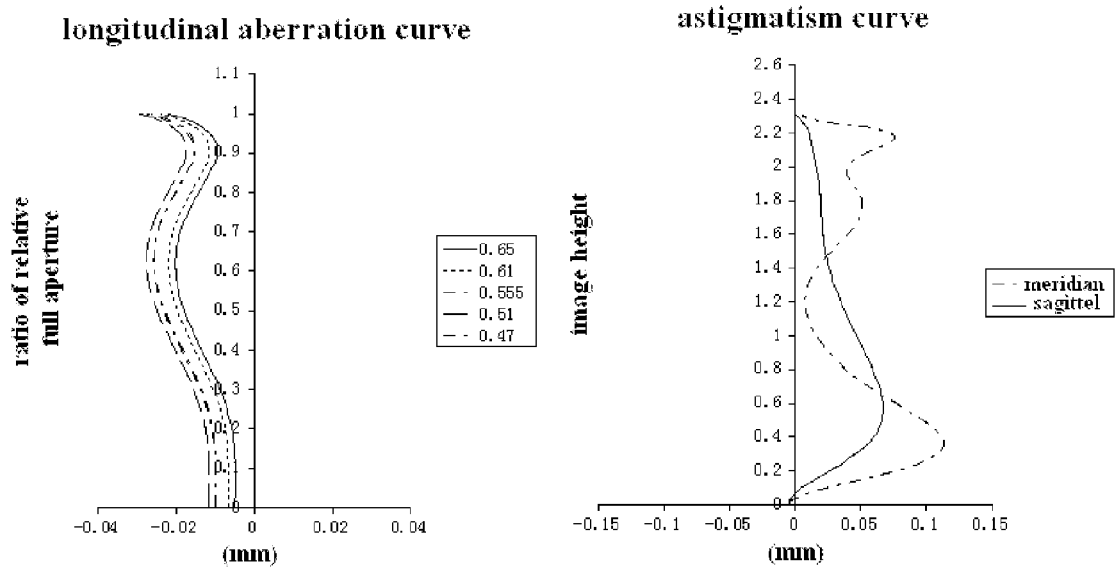
FIG. 32 is a longitudinal aberration chart (mm) of a lens system according to Embodiment 7 of the present disclosure.
FIG. 33 is an astigmatism chart (mm) of a lens system according to Embodiment 7 of the present disclosure.
Figure 34:
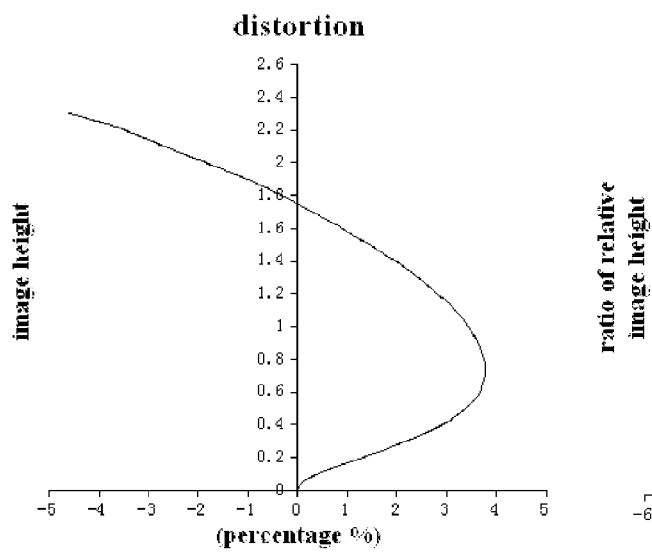
FIG. 34 is a distortion chart (%) of a lens system according to Embodiment 7 of the present disclosure.
Figure 35:
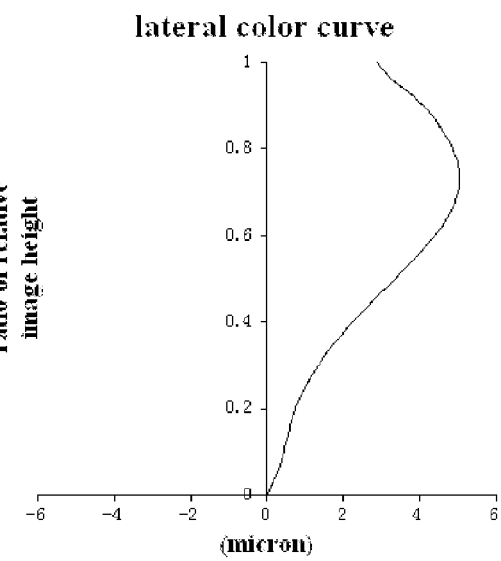
FIG. 35 is a lateral color chart (mm) of a lens system according to Embodiment 7 of the present disclosure.

FIG. 32 is a longitudinal aberration chart (mm) of a lens system according to Embodiment 7 of the present disclosure, FIG. 33 is an astigmatism chart (mm) of a lens system according to Embodiment 7 of the present disclosure, FIG. 34 is a distortion chart (%) of a lens system according to Embodiment 7 of the present disclosure, and FIG. 35 is a lateral color chart (mm) of a lens system according to Embodiment 7 of the present disclosure. Thus it can be seen that, the aberration of the lens system is effectively controlled.

Embodiment 8

Figure 36:
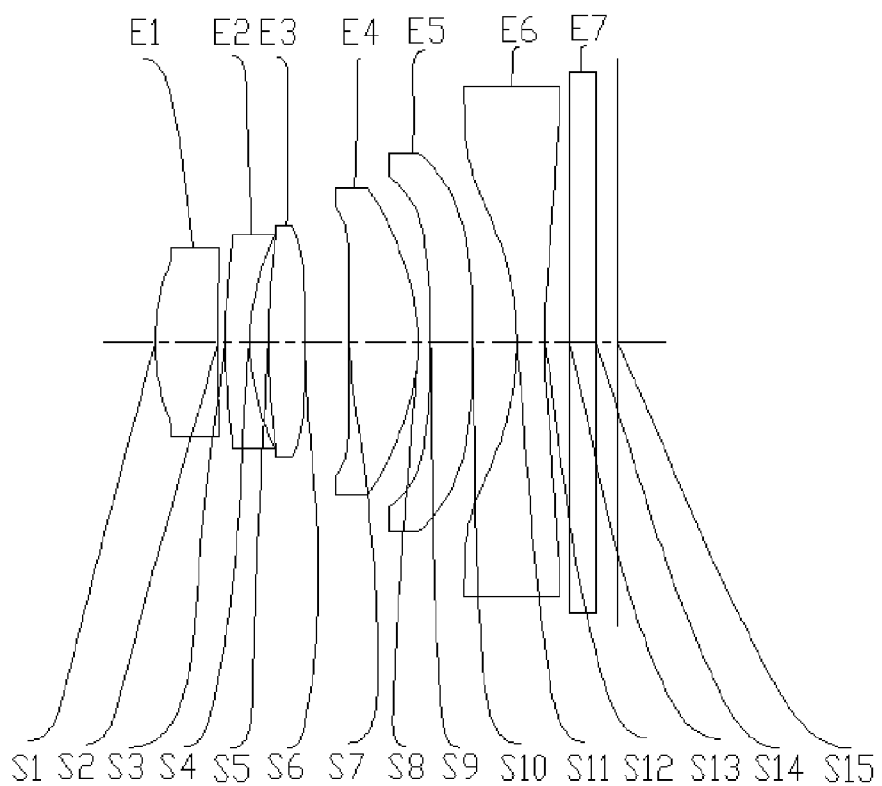
FIG. 36 is a schematic diagram of a lens system according to Embodiment 8 of the present disclosure.

FIG. 36 is a schematic diagram of a lens system according to Embodiment 8 of the present disclosure. In Embodiment 8, the lens system satisfies conditions in following tables:

TABLE 15

| Surface | Curvature radius | Thickness | Material | Effective diameter | Conic coefficient |
|---|---|---|---|---|---|
| Object | infinity | infinity | | | |
| Aperture stop + S1 | 1.6978 | 0.5072 | APL5514 | 0.6674 | −1.0071 |
| S2 | 500.0000 | 0.0555 | | 0.7581 | −499.9994 |
| S3 | 3.9703 | 0.1977 | SP3810 | 0.8010 | −39.1190 |
| S4 | 1.7071 | 0.1500 | | 0.8586 | −2.2101 |
| S5 | 5.4762 | 0.3000 | APL5514 | 0.8676 | −25.8768 |
| S6 | −13.1898 | 0.3445 | | 0.9273 | 165.2929 |
| S7 | 19.6995 | 0.5653 | APL5514 | 1.0814 | −197.3479 |
| S8 | −1.4634 | 0.0953 | | 1.2323 | −0.3948 |
| S9 | −7.3867 | 0.3392 | EP5000 | 1.3243 | −502.2330 |
| S10 | −15.6449 | 0.3536 | | 1.5169 | −5.3703 |
| S11 | −3.0558 | 0.2228 | APL5514 | 1.7556 | −1.6311 |
| S12 | 4.5734 | 0.1993 | | 2.0532 | 1.9459 |
| S13 | infinity | 0.2100 | BK7 | 2.1001 | |
| S14 | infinity | 0.1779 | | 2.1751 | |
| S15 | infinity | | | 2.2804 | |

TABLE 16

| surface | A4 | A6 | A8 | A10 | A12 | A14 | A16 |
|---|---|---|---|---|---|---|---|
| S1 | 1.1497E−02 | −4.5926E−03 | 6.0641E−03 | −6.0913E−03 | −5.8544E−03 | −1.0724E−02 | −2.3011E−02 |
| S2 | 3.4380E−02 | −1.7468E−02 | 2.1871E−02 | −2.3820E−02 | −8.1228E−03 | −1.3004E−02 | −2.0641E−02 |
| S3 | −1.3967E−02 | 5.5674E−03 | 2.2174E−02 | −2.1149E−02 | 1.0275E−02 | 1.1047E−02 | 1.1010E−02 |
| S4 | −3.2185E−02 | 5.6538E−02 | −1.9294E−02 | 2.4020E−03 | 1.8215E−03 | 5.3951E−03 | 1.0396E−02 |
| S5 | 1.3841E−02 | −2.2416E−02 | 3.3850E−03 | 1.0174E−02 | −2.5844E−04 | −2.1687E−03 | −5.1296E−03 |
| S6 | −3.9269E−02 | −4.6199E−02 | −2.0119E−02 | 1.7213E−03 | −1.1327E−03 | 2.3248E−03 | 4.8414E−03 |
| S7 | −4.9280E−02 | 3.2439E−02 | −3.5955E−02 | −2.5774E−02 | 3.4088E−03 | 2.2553E−04 | −1.1165E−03 |
| S8 | 1.4902E−01 | −3.3759E−02 | −1.1967E−02 | −2.3326E−03 | −7.9522E−04 | 7.9764E−04 | 1.0709E−03 |
| S9 | −1.3111E−01 | 2.8040E−01 | −3.7578E−01 | 2.2598E−01 | −5.5709E−02 | −6.9893E−03 | 4.2965E−03 |
| S10 | −1.7727E−01 | 2.9635E−01 | −3.4504E−01 | 2.2626E−01 | −8.6777E−02 | 1.7890E−02 | −1.5070E−03 |
| S11 | 1.5019E−01 | 1.9926E−01 | −1.8564E−01 | 1.1855E−01 | −4.2527E−02 | 7.7408E−03 | −5.6027E−04 |
| S12 | −7.4946E−02 | 3.7741E−02 | −1.3989E−02 | 3.0663E−03 | −3.0238E−04 | −2.2903E−06 | 1.4893E−06 |

In addition, TTL=4.42 mm, f1=3.12 mm, f2=−4.82 mm, f3=7.13 mm, f4=2.52 mm, f5=−22.21 mm, f6=−3.32 mm and f=2.54 mm.

Figure 37:
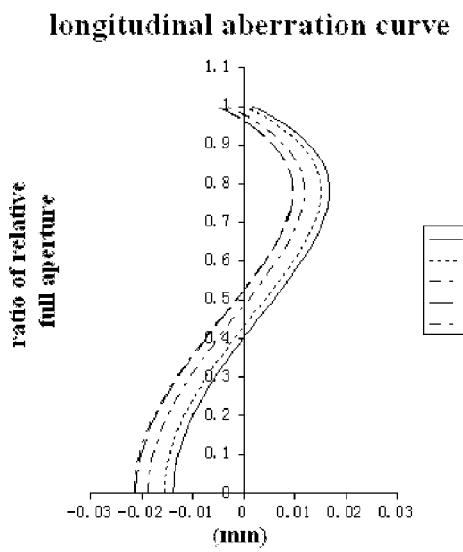
FIG. 37 is a longitudinal aberration chart (mm) of a lens system according to Embodiment 8 of the present disclosure.
Figure 38:
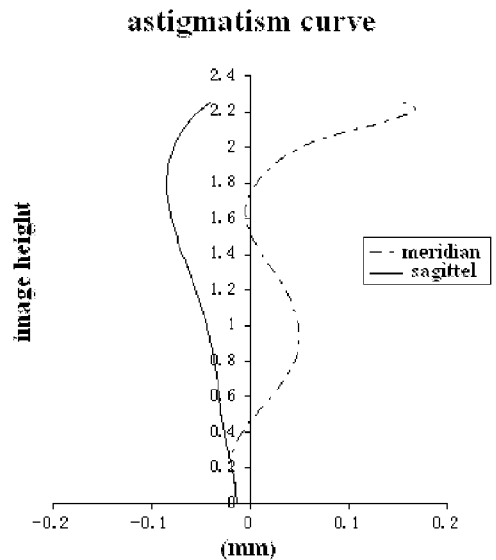
FIG. 38 is an astigmatism chart (mm) of a lens system according to Embodiment 8 of the present disclosure.
Figure 39:
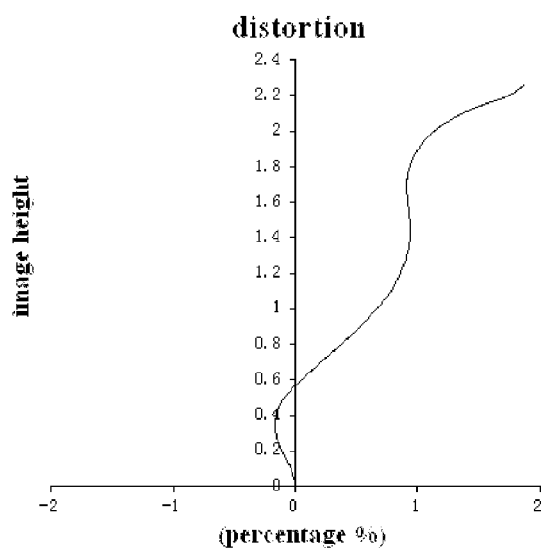
FIG. 39 is a distortion chart (%) of a lens system according to Embodiment 8 of the present disclosure.
Figure 40:
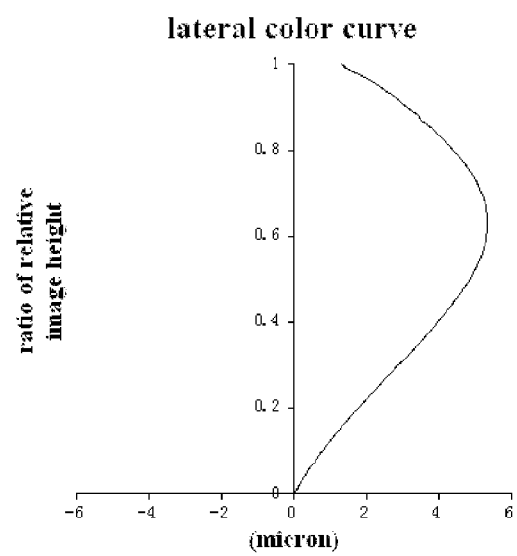
FIG. 40 is a lateral color chart (mm) of a lens system according to Embodiment 8 of the present disclosure.

FIG. 37 is a longitudinal aberration chart (mm) of a lens system according to Embodiment 8 of the present disclosure, FIG. 38 is an astigmatism chart (mm) of a lens system according to Embodiment 8 of the present disclosure, FIG. 39 is a distortion chart (%) of a lens system according to Embodiment 8 of the present disclosure, and FIG. 40 is a lateral color chart (mm) of a lens system according to Embodiment 8 of the present disclosure. Thus it can be seen that, the aberration of the lens system is effectively controlled.

Embodiment 9

FIG. 41 is a schematic diagram of a lens system according to Embodiment 9 of the present disclosure. In Embodiment 9, the lens system satisfies conditions in a following table:

TABLE 17

| Surface | Curvature radius | Thickness | Material | Effective diameter | Conic coefficient |
|---|---|---|---|---|---|
| Object | infinity | infinity | | | |
| Aperture stop + S1 | 1.9572 | 0.8453 | APL5514 | 1.1514 | −0.9302 |
| S2 | −16.0914 | 0.1442 | | 1.1733 | −151.9846 |
| S3 | 3.3385 | 0.2527 | 1.639/23.29 | 1.1580 | −25.7104 |
| S4 | 1.4662 | 0.2765 | | 1.1477 | −4.0122 |
| S5 | 4.4517 | 1.1652 | APL5514 | 1.1759 | −19.3407 |
| S6 | −4.0110 | 0.4153 | | 1.3563 | −0.4084 |
| S7 | −15.6139 | 0.2634 | APL5514 | 1.3000 | −1000.0000 |
| S8 | 8999.9877 | 0.0710 | | 1.4203 | 356.9582 |
| S9 | −10.0000 | 0.4496 | EP5000 | 1.4218 | −500.0001 |
| S10 | −15.2477 | 0.1483 | | 1.6740 | −64.2130 |
| S11 | −4.9849 | 0.6871 | APL5514 | 1.7239 | 2.1130 |
| S12 | 2.9504 | 0.1703 | | 2.2218 | −4.5431 |
| S13 | infinity | 0.2100 | BK7 | 2.2636 | |
| S14 | infinity | 0.0973 | | 2.2872 | |
| S15 | infinity | | | 2.3040 | |

TABLE 18

| Surface | A4 | A6 | A8 | A10 | A12 | A14 | A16 |
|---|---|---|---|---|---|---|---|
| S1 | 1.5447E−02 | −3.5373E−03 | 6.3945E−03 | −6.6931E−03 | 1.1220E−05 | 2.8408E−03 | −1.3982E−03 |
| S2 | 2.5952E−02 | −3.0005E−02 | 1.7168E−02 | −1.3925E−02 | 5.2035E−03 | −1.6794E−04 | −7.5713E−04 |
| S3 | −3.1042E−02 | −6.7669E−06 | 1.7720E−02 | −2.4392E−02 | 9.5265E−03 | 6.1121E−03 | −4.5101E−0 |
| S4 | −2.4299E−02 | 5.7434E−02 | −3.2087E−02 | 5.2665E−03 | 7.4923E−03 | 4.2390E−03 | −4.0643E−03 |
| S5 | 1.5633E−02 | −9.7583E−03 | 2.5576E−03 | 2.3814E−04 | −2.3250E−03 | 1.7804E−03 | 3.7374E−06 |
| S6 | −2.6010E−02 | −1.0450E−03 | −7.0842E−03 | 2.4977E−03 | −1.1986E−03 | 9.5895E−06 | −4.7252E−05 |
| S7 | −8.4369E−02 | −2.3059E−02 | 4.0344E−03 | −1.7278E−02 | 2.8941E−03 | 8.8351E−04 | 4.4065E−05 |
| S8 | −5.7451E−02 | −2.6773E−02 | −1.0676E−02 | 3.4761E−03 | 2.6190E−04 | −2.2252E−04 | 1.8899E−04 |
| S9 | −1.8148E−01 | 2.7225E−01 | −3.5455E−01 | 2.2281E−01 | −5.6850E−02 | −6.4521E−03 | 4.2328E−03 |
| S10 | −1.8322E−01 | 2.8916E−01 | −3.3862E−01 | 2.2689E−01 | −8.6971E−02 | 1.7818E−02 | −1.4945E−03 |
| S11 | −1.9494E−01 | 1.9772E−01 | −1.8419E−01 | 1.1914E−01 | −4.2473E−02 | 7.7290E−03 | −5.6961E−04 |
| S12 | −8.5820E−02 | 3.9167E−02 | −1.3428E−02 | 2.9914E−03 | −3.1578E−04 | −1.4942E−06 | 1.6374E−06 |

In addition, TTL=5.2 mm, f1=3.28 mm, f2=−4.37 mm, f3=4.1 mm, f4=−28.79 mm, f5=−47.81 mm, f6=−3.32 mm and f=4.37 mm.

Figure 44:
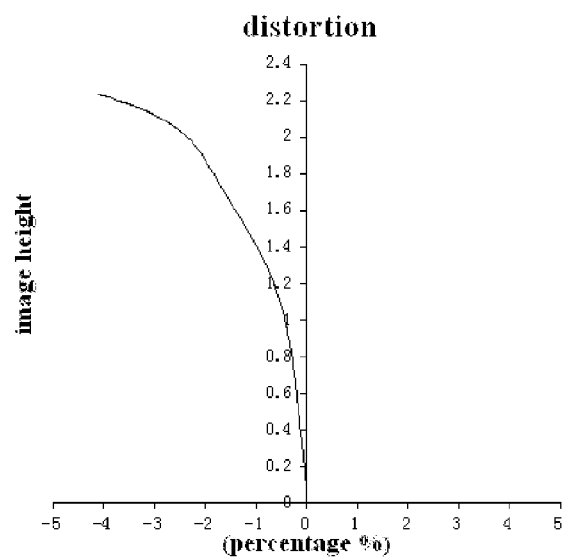
FIG. 44 is a distortion chart (%) of a lens system according to Embodiment 9 of the present disclosure.
Figure 45:
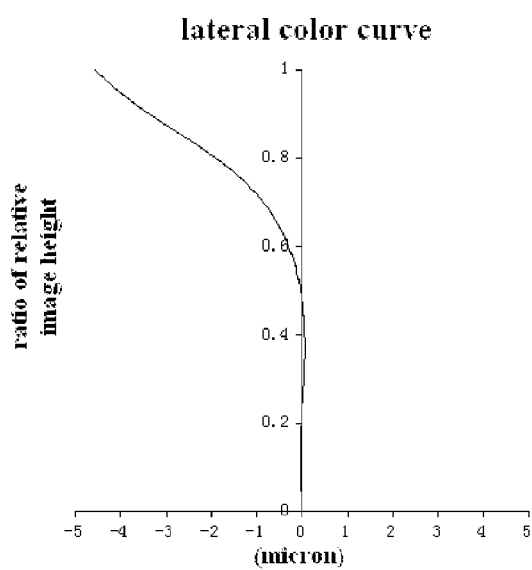
FIG. 45 is a lateral color chart (mm) of a lens system according to Embodiment 9 of the present disclosure.

FIG. 42 is a longitudinal aberration chart (mm) of a lens system according to Embodiment 9 of the present disclosure, FIG. 43 is an astigmatism chart (mm) of a lens system according to Embodiment 9 of the present disclosure, FIG. 44 is a distortion chart (%) of a lens system, and FIG. 45 is a lateral color chart (mm) of a lens system according to Embodiment 9 of the present disclosure. Thus it can be seen that, the aberration of the lens system is effectively controlled.

In the embodiments 1-9, each conditional satisfies conditions in a following table:

TABLE 19

| | Embodiment | | | | | | | | |
|---|---|---|---|---|---|---|---|---|---|
| | 1 | 2 | 3 | 4 | 5 | 6 | 7 | 8 | 9 |
| f456/Dr7r12 | −4.298 | −4.849 | −5.481 | −4.702 | −5.02 | −3.01 | 4.01 | 5 | −1.65 |
| f456/f | −1.738 | −1.996 | −2.276 | −1.908 | −2.04 | −1.24 | 2.9 | 3.1 | −0.61 |
| f5/f | −6.02 | −5.77 | −6.36 | −6.08 | −4.61 | −14.9 | −6.06 | −8.76 | −10.95 |
| (R9 + R10)/(R9 − R10) | −1.29 | −1.32 | −1.37 | −1.3 | −1.95 | −4.01 | −4.96 | −2.79 | −4.81 |
| R12/f | 0.97 | 0.98 | 0.95 | 1 | 1.29 | 0.83 | 0.62 | 1.8 | 0.68 |
| \|(R11 + R12)/(R11 − R12)\| | −0.32 | −0.29 | −0.27 | −0.31 | 0.44 | 0.27 | 0.81 | −0.2 | 0.26 |
| TTL/ImgH | 1.92 | 1.93 | 1.93 | 1.92 | 1.83 | 1.82 | 2.15 | 1.65 | 2.33 |

Reference throughout this specification to "an embodiment," "some embodiments," "exemplary embodiments," "examples," "specific examples," or "some examples," means that a particular feature, structure, material, or characteristic described in connection with the embodiment or example is included in at least one embodiment or example of the present disclosure. Thus, these terms throughout this specification do not necessarily refer to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that various changes, amendments, replacements, and modifications can be made in the embodiments without departing from spirit and principles of the present disclosure. The scope of the present disclosure is defined by the claims and the like.

What is claimed is:

1. A lens system, comprising a first lens group and a second lens group from an object side to an image side successively, wherein
the first lens group comprises a first lens, a second lens and a third lens from the object side to the image side successively; the second lens group comprises a fourth lens, a fifth lens and a sixth lens from the object side to the image side successively,
the first lens has a positive focal power and the object side surface of the first lens is convex, the second lens has a negative focal power and the object side surface of the second lens is convex, the fifth lens has a negative focal power and the image side surface of the fifth lens is convex, the sixth lens has a negative focal power and the object side surface of the sixth lens is concave, the image side surface of the second lens is concave, the object side surface of the fifth lens is concave, the image side surface of the sixth lens is concave, and the lens system satisfies conditional expressions as follows:

$-6.8 < f4.5.6/Dr7r12 < -3.0$; and $-3.2 < f4.5.6/f < -1.65$, in which, f4.5.6 represents an effective focal length of the second lens group, Dr7r12 represents an axis distance between the object side surface of the fourth lens and the image side surface of the sixth lens, and f represents the effective focal length of the lens system.

2. The lens system according to claim 1, wherein the image side surface of the first lens is concave.

3. The lens system according to claim 2, wherein the third lens and the fourth lens have a positive focal power, the object side surface and the image side surface of the third lens are convex, the object side surface of the fourth lens is concave, and the image side surface of the fourth lens is convex.

4. The lens system according to claim 1, wherein the lens system further comprises an aperture stop set at the object side of the second lens.

5. A lens system, comprising a first lens group and a second lens group from an object side to an image side successively, wherein
the first lens group comprises a first lens, a second lens and a third lens from the object side to the image side successively, the second lens group comprises a fourth lens, a fifth lens and a sixth lens from the object side to the image side successively;
the first lens has a positive focal power and the object side surface of the first lens is convex, the second lens has a negative focal power and the object side surface of the second lens is convex, the fifth lens has a negative focal power and the image side surface of the fifth lens is convex, the sixth lens has a negative focal power and the object side surface of the sixth lens is concave, the image side surface of the second lens is concave, the object side surface of the fifth lens is concave, the image side surface of the sixth lens is concave, and
the lens system satisfies conditional expressions as follows:

$-6.8 < f4.5.6/Dr7r12\_5$; and $-3.2 < f4.5.6/f\_3.1$, in which, f4.5.6 represents an effective focal length of the second lens group, Dr7r12 represents an axis distance between the object side surface of the fourth lens and the image side surface of the sixth lens, and f represents the effective focal length of the lens system.

6. The lens system according to claim 5, wherein the lens system satisfies conditional expressions as follows:

$-18 < f5/f < -4.6$; and $-6 < (R9+R10)/(R9-R10) < 1$, in which, f5 represents the effective focal length of the fifth lens, R9 represents a curvature radius of the object side surface of the fifth lens and R10 represents the curvature radius of the image side surface of the fifth lens.

7. The lens system according to claim 5, wherein the lens system satisfies conditional expressions as follows:

$$0.5 < R12/f < 1.5; \text{ and}$$

$$|(R11+R12)/(R11-R12)| < 1,$$

in which, R11 represents a curvature radius of the object side surface of the sixth lens and R12 represents a curvature radius of the image side surface of the sixth lens.

8. The lens system according to claim 5, in which, the lens system satisfies conditional expressions as follows:

$$1.7 < TTL/ImgH < 2.4;$$

in which, TTL represents an overall length of the lens system, ImgH is a half of a diagonal length of an effective pixel area on an imaging plane.

9. The lens system according to claim 2, wherein the lens system further comprises an aperture stop set at the object side of the second lens.

10. The lens system according to claim 3, wherein the lens system further comprises an aperture stop set at the object side of the second lens.

11. The lens system according to claim 6, in which, the lens system satisfies conditional expressions as follows:

$$1.7 < TTL/ImgH < 2.4;$$

in which, TTL represents an overall length of the lens system, ImgH is a half of a diagonal length of an effective pixel area on an imaging plane.

12. The lens system according to claim 7, in which, the lens system satisfies conditional expressions as follows:

$$1.7 < TTL/ImgH < 2.4;$$

in which, TTL represents an overall length of the lens system, ImgH is a half of a diagonal length of an effective pixel area on an imaging plane.

* * * * *